(12) United States Patent
Huang

(10) Patent No.: US 12,105,861 B2
(45) Date of Patent: Oct. 1, 2024

(54) RANSOMWARE-AWARE SOLID-STATE DRIVE

(71) Applicant: The Board of Trustees of the University of Illinois, Urbana, IL (US)

(72) Inventor: Jian Huang, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 173 days.

(21) Appl. No.: 18/046,341

(22) Filed: Oct. 13, 2022

(65) Prior Publication Data

US 2023/0119688 A1    Apr. 20, 2023

Related U.S. Application Data

(60) Provisional application No. 63/262,505, filed on Oct. 14, 2021.

(51) Int. Cl.
*G06F 21/79* (2013.01)
*G06F 21/56* (2013.01)

(52) U.S. Cl.
CPC ............ *G06F 21/79* (2013.01); *G06F 21/566* (2013.01); *G06F 21/567* (2013.01); *G06F 21/568* (2013.01)

(58) Field of Classification Search
CPC .................. G06F 21/566–568; G06F 21/78–79
See application file for complete search history.

(56) References Cited

U.S. PATENT DOCUMENTS

2017/0083405 A1*  3/2017  Basham .................. G06F 11/14
2019/0138727 A1*  5/2019  Dontov .............. G06F 11/1464
2022/0350887 A1* 11/2022  Kahn .................... G06F 21/561

OTHER PUBLICATIONS

J. Park, Y. Jung, J. Won, M. Kang, S. Lee, and J. Kim, "Ransomblocker: a low-overhead ransomware-proof ssd," in Proceedings of the 57th Design Automation Conference (DAC'19), Las Vegas, USA, Jun. 2019.
Power Loss Protection, "https://www.atpinc.com/blog/how-industrial-SSDs-handles-power-loss)," 2020. This link takes you to this article: "Harnessing Microcontrollers to Deliver Intelligent SSD Power Management and PLP Capabilities"—is this accurate, 2020 , 4 pages.

(Continued)

*Primary Examiner* — Kevin Bechtel
(74) *Attorney, Agent, or Firm* — McDonnell Boehnen Hulbert & Berghoff LLP

(57) ABSTRACT

An example embodiment may involve a storage device comprising one or more processors, memory, a host interface connectable to a host device, a network interface connectable to a backup device, and program instructions, stored in the memory, that upon execution by the one or more processors cause the storage device to perform operations comprising: causing data received, by way of the host interface, to be stored in a page of the memory; after storing the data, marking the page as invalid due to input/output operations of the memory; determining a predicted idle time period within which the memory is not expected to be engaged in further input/output operations; determining that a duration of the predicted idle time period exceeds a threshold length; and during the predicted idle time period, transmitting, by way of the network interface, the data to the backup device.

20 Claims, 18 Drawing Sheets

(56) References Cited

OTHER PUBLICATIONS

Prabhakaran et al., "Analysis and Evolution of Journaling File Systems," USENIX Annual Technical Conference (USENIX ATC'05), 2005, pp. 105-120.
V Prabhakaran et al., "Transactional Flash," Proceedings of the 8th USENIX Symposium on Operating Systems Design and Implementation (OSDI'08), 2008, pp. 147-160.
Prilock Security, "Ransomware Attack Every 14 Seconds," https://www.prnewswire.com/news-releases/ransomware-attack-every-14-seconds-prilock-announces-3-99-for-1-click-protection-300986165.html, 2020, 3 pages.
Ransomware Costs, "https://purplesec.us/resources/cyber-security-statistics/ransomware/#:~:text=The%20Cost%20Of%20Ransomware%20Attacks,2019%20%E2%80%93%20%2411.5%20billion," 2020.
Reardon et al., "SoK: Secure Data Deletion," 2013 IEEE Symposium on Security and Privacy (Oakland'13), 2013, pp. 301-315.
Rosenblum et al., "The Design and Implementation of a Log-Structured File System," ACM Transactions on Computer Systems (TOCS), 1992, pp. 26-52, vol. 10, No. 1.
Scaife et al., "CryptoLock (and Drop It): Stopping Ransomware Attacks on User Data," Proceedings of the 2016 IEEE 36th International Conference on Distributed Computing Systems (ICDCS'16), 2016, pp. 303-312.
Seshadri et al., "Willow: A User-Programmable SSD," in Proceedings of the 11th USENIX Conference on Operating Systems Design and Implementation (OSDI'14), Broomfield, CO, 2014, 15 pages.
Sgandurra et al., "Automated Dynamic Analysis of Ransomware: Benefits, Limitations and use for Detection," arXiv:1609.03020v1, Sep. 10, 2016, 12 pages.
Shore—MT, https://sites.google.com/view/shore-mt/, 2014, 3 pages.
Sivathanu et al., "Enhancing File System Integrity Through Checksums," Technical Report FSL-04-04, 2004, 5 pages.
Strunk et al., "Self-Securing Storage: Protecting Data in Compromised System," in Proceedings of the 4th USENIX Conference on Symposium on Operating System Design & Implementation (OSDI'00), 2000, 15 pages.
S. Subramanian, S. Sundararaman, N. Talagala, A. C. Arpaci-Dusseau, and R. H. Arpaci-Dusseau, "Snapshots in a lash with iosnap," in Proceedings of the 9th ACM European Conference on Computer Systems (EuroSys'14), 2014, 23 pages.
Khadye, Aniruddha, "DP83867E/IS/CS/IR/CR RGZ Power Consumption Data," Texas Instruments, White Paper, SNLA241, Oct. 2015, 13 pages.
The OpenSSD Project, http://www.openssd-project.org/wiki/The_OpenSSD_Project, 2019.
H.-W. Tseng, Q. Zhao, Y. Zhou, M. Gahagan, and S. Swanson, "Morpheus: Creating Application Objects Efficiently for Heterogeneous Computing," 2016 ACM/IEEE 43rd Annual International Symposium on Computer Architecture (ISCA'16), Taipei, Taiwan, Jun. 2016, pp. 53-65.
Virus Total—Free Online Virus, Malware and URL Scanner, https://www.virustotal.com/, 2016.
X. Wang, Y. Zhou, C. C. Coats, and J. Huang, "Project Almanac: A Time-Traveling Solid-State Drive," in Proceedings of the 14th European Conference on Computer Systems (EuroSys'19), Dresden, Germany, 2019.
Y. Wang and Y. Shen, "RIA—An Audition-based Method to Protect the Runtime Integrity of MapReduce Applications," in 23rd ACM Conference on Computer and Communications Security, Vienna, Austria, Oct. 2016, 18 pages.
Wikipedia, "WannaCry Ransomware Attack," https://en.wikipedia.org/wiki/WannaCry_ransomware_attack, 2017.
Wei et al., "Reliably Erasing Data from Flash-Based Solid State Drives," Proccedings of 9th USENIX Conference on File and Storage Technologies (FAST'11), 2011, 13 pages.
Wu et al., "Delta-FTL: Improving SSD Lifetime via Exploiting Content Locality," in Proceedings of the 7th ACM European Conference on Computer Systems (EuroSys'12), 2012, 13 pages.

D. Xu, J. Ming, and D. Wu, "Cryptographic Function Detection in Obfuscated Binaries via Bit-precise Symbolic Loop Mapping," in Proceedings of the 38th IEEE Symposium on Security and Privacy (Oakland'17), San Jose, CA, May 2017.
Ren et al., "I-CASH: Intelligently Coupled Array of SSD and HDD," in Proceedings of the 2011 IEEE 17th International Symposium on High Performance Computer Architecture (HPCA'11), 2011, 12 pages.
L. Zhang, S. Shetty, P. Liu, and J. Jing, "RootkitDet: Practical End-to-End Defense Against Kernel Rootkits in a Cloud Environment," in Proceedings of the 19th European Symposium on research in Computer Security (ESORICS'14), Wroclaw, Poland, Sep. 2014.
Zhang et al., "End-to-end Data Integrity for File Systems: A ZFS Case Study," in Proceedings of the 8th USENIX Conference on File and Storage Technologies (FAST'10), San Jose, CA, Feb. 2010, 14 pages.
Zhang-Kennedy et al., "The aftermath of a crypto-ransomware attack at a large academic institution," in 27th USENIX Security Symposium (Security'18), Baltimore, MD, Aug. 2018, 19 pages.
Azure Storage Redundancy, "https://docs.microsoft.com/enus/azure/storage/common/storage-redundancy," 2021.
Intel Corporation, "Intel® Optane™ SSD DC P4801X Series," 2018.
S. Kipp, "Will SSD replace HDD," Technical Report, 2015.
"Samsung SmartSSD," https://forums.xilinx.com/t5/Xilinx-Xclusive-Blog/Samsung-Electronics-Unveils-Xilinx-Based-SmartSSD\-Solution/bap/902137, 2018.
Russinvoch, et al., Microsoft Windows Internals: Microsoft Windows Server 2003, Windows XP, and Windows 2000. Microsoft Press Redmond, 2005, vol. 4.
Samsung, "Samsung ssd 850 pro data sheet, rev.2.0," 2017, http://www.samsung.com/semiconductor/minisite/ssd/downloads/document/Samsung_SSD_850_PRO_Data_Sheet_rev_2_0.pdf, https://images-eu.ssl-images-amazon.com/images/I/81tHEOsrKRS.pdf, 2017, 4 pages.
S. Semiconductors, "Ultra-Low Latency with Samsung Z-NAND SSD," Technical Report, 2018.
Mearian, Lucas, SSD prices plummet again, Close in on HDDs, https://www.computerworld.com/article/3040694/ssd-prices-plummet-again-close-in-on-hdds.html , 2016, 5 pages.
C. Preston, Backup & recovery: inexpensive backup solutions for open systems. O'Reilly Media, Inc., 2007.
20 Cybersecurity Statistics That Matter in 2019, https://www.appknox.com/blog/cybersecurity-statistics-2019, 2019.
Amazon S3 Pricing, https://aws.amazon.com/s3/pricing/, 2020.
Amazon S3 Pricing, "https://aws.amazon.com/s3/pricing/," 2021.
N. Andronio, S. Zanero, and F. Maggi, "HelDroid: Dissecting and Detecting Mobile Ransomware," in Proceedings of the International Symposium on Research in Attacks, Intrusion and Detection (RAID'15), Kyoto, Japan, Nov. 2015.
Andy Patrizio, "Western Digital Rolls Out NVMe-over-Fabric SSDs for Legacy Storage Migration, https://www.networkworld.com/article/3564607/western-digitalrolls-out-nvme-over-fabric-ssds-for-legacy-storage-migration.html," 2020.
G. Ateniese, R. Burns, R. Curtmola, J. Herring, L. Kissner, Z. Peterson, and D. Song, "Provable Data Possession at Untrusted Stores," in Proceedings of 14th ACM Conference on Computer and Communications Security (CCS'07), Alexandria, VA, Oct. 2007.
Azure Storage Overview Pricing, https://azure.microsoft.com/en-us/pricing/details/storage/, 2020.
E. Bachmat and J. Schindler, "Analysis of methods for scheduling low priority disk drive tasks," in Proceedings of the 2002 ACM SIGMETRICS International Conference on Measurement and Modeling of Computer Systems (SIGMETRICS'02), 2002.
S. Baek, Y. Jung, A. Mohaisen, S. Lee, and D. Nyang, "SSD-insider: Internal defense of solid-state drive against ransomware with perfect data recovery," in Proceedings of 2018 IEEE 38th International Conference on Distributed Computing Systems (ICDCS'18), Vienna, Austria, 2018.
Boncheol Gu and Andre S. Yoon and Duck-Ho Bae and Insoon Jo and Jinyoung Lee and Jonghyun Yoon and Jeong-Uk Kang and Moonsang Kwon and Chanho Yoon and Sangyeun Cho and Jaeheon Jeong and Duckhyun Chang, "Biscuit: A Framework for Near-Data

(56) References Cited

OTHER PUBLICATIONS

Processing of Big Data Workloads," in Proceedings of the ACM/IEEE 43rd Annual International Symposium on Computer Architecture (ISCA'16), Jun. 2016.
K. R. B. Butler, S. Mclaughlin, and P. D. McDaniel, "Rootkit-Resistant Disks," in Proceedings of the 15th ACM Conference on Computer and Communications Security (CCS'08), Alexandria, VA, Oct. 2008.
S. A. Carr and M. Payer, "DataShield: Configurable Data Confidentiality and Integrity," in ACM Asia Conference on Computer and Communications Security (ASIACCS'17), Abu Dhabi, UAE, Apr. 2017.
A. M. Caulfield, T. I. Mollov, L. Eisner, A. De, J. Coburn, and S. Swanson, "Providing safe, user space access to fast, solid state disks," in Proceedings of the 17th International Conference on Architectural Support for Programming Languages and Operating Systems (ASPLOS'12), London, England, Mar. 2012.
F. Chen, R. Lee, and X. Zhang, "Essential roles of exploiting internal parallelism of flash memory based solid state drives in high-speed data processing," in Proceedings of the IEEE 17th International Symposium on High Performance Computer Architecture (HPCA'11). IEEE, 2011.
L. Chen, C.-Y. Yang, A. Paul, and R. Sahita, "Towards Resilient Machine Learning for Ransomware Detection," in Proceedings of the 25th ACM SIGKDD Conference on Knowledge Discovery and Data Mining (KDD'19), Anchorage, Alaska, Aug. 2019. arXiv:1812.09400v2 May 16, 2019.
J. Coburn, T. Bunker, M. Schwarz, R. Gupta, and S. Swanson, "From aries to mars: Transaction support for next-generation, solid-state drives," in Proceedings of the Twenty-Fourth ACM Symposium on Operating Systems Principles (SOSP'13), 2013.
Comparing IBM Tivoli storage manager and veritas netbackup in real-world environments, A summary by IBM of the whitepaper and benchmark written by Progressive Strategies, 2002.
A. Continella, A. Guagneli, G. Zingaro, G. D. Pasquale, A. Barenghi, S. Zanero, and F. Maggi, "ShieldFS: A Self-healing, Ransomware-aware Filesystem," in Proc. the 32nd Annual Conference on Computer Security Applications (ACSAC'16), Los Angeles, CA, Dec. 2016.
Data Protection in Amazon S3, "https://docs.aws.amazon.com/AmazonS3/latest/userguide/DataDurability.html," 2021.
Encryption and Security Development in Solid State Storage Devices, https://www.delkin.com/blog/encryption-and-security-development-in-solid-state-storage-devices-ssd/, 2020.
FIU Traces, http://iotta.snia.org/traces/390, 2010.
Mellor—Gartner Sees Enterprise SSD-HDD Revenue Crossover in 2017, https://www.theregister.co.uk/2016/01/07/gartner_enterprise_ssd_hdd_revenue_crossover_in_2017/, 2017.
J. Gross, "Cloud based storage: A brief look at dropbox," Chronicles, vol. 30, No. 4, 2013.
A. Gupta, Y. Kim, and B. Urgaonkar, "DFTL: a flash translation layer employing demand-based selective caching of page-level address mappings," in Proceedings of the 14th International Conference on Architectural Support for Programming Languages and Operating System (ASPLOS'09), 2009.
Athrow, Desire, "Here's the cheapest hard drive per TB right now," "https://www.techradar.com/news/heres-the-cheapest-hard-drive-per-tb-right-now," 2020, 12 pages.
Huang et al., "FlashGuard: Leveraging Intrinsic Flash Properties to Defend Against Encryption Ransomware," in Proceedings of the 24th ACM Conference on Computer and Communications Security (CCS'17), Dallas, TX, 2017, 14 pages.
P. Huang, K. Zhou, H. Wang, and C. H. Li, "BVSSD: Build Built-in Versioning Flash-Based Solid State Drives," in Proceedings of 5th Annual International Systems and Storage Conference (SYSTOR'12), Haifa, Israel, 2012.
Costan et al., "Intel SGX Explained," "https://eprint.iacr.org/2016/086.pdf," 2016, 118 pages.
IOzone Lab, http://www.iozone.org/, 2016, 5 pages.

Burt, Jeffrey, "Bringing NVMe Over Fabrics Into the Storage Big Tent," https://www.nextplatform.com/2019/02/26/bringing-nvme-overfabrics-into-the-storage-big-tent/, 2019, 7 pages.
Edwards, John, "NVMe over Fabrics creates data-center storage disruption," https://www.networkworld.com/article/3394296/nvmeover-fabrics-creates-data-center-storage-disruption.html, 2019, 6 pages.
Kharaz et al., "UNVEIL: A Large-Scale, Automated Approach to Detecting Ransomware," 25th USENIX Security Symposium, Austin, TX, Aug. 2016, pp. 757-772.
A. Kharraz, W. Robertson, D. Balzarotti, L. Bilge, and E. Kirda, "Cutting the Gordian Knot: A Look Under the Hood of Ransomware Attacks," in Conference on Detection of Intrusions and Malware & Vulnerability Assessment (DIMVA), Milan, IT, Jun. 2015.
Kolodenker et al. "PayBreak: Defense Against Cryptographic Ransomware," Asia CCS '17, Apr. 2-6, 2017, Abu Dhabi, United Arab Emirates, ACM, 2017, 13 pages.
Koo et al., "Summarizer: Trading Bandwidth with computing near storage," in 50th Annual IEEE/ACM International Symposium on Microarchitecture, Boston, MA, 2017.
Krishnan et al., "The Effects of Metadata Corruption on NFS," in Proceedings of the 2007 ACM Workshop on Storage Security and Survivability (StorageSS'07), Alexandria, VA, Oct. 2007, 6 pages.
Lee et al., "F2FS: A New File System for Flash Storage," 13th USENIX Conference on File and Storage Technologies, (FAST'15), 2015, pp. 273-286.
J. Lee, Y. Kim, G. M. Shipman, S. Oral, and J. Kim, "Preemptible i/o scheduling of garbage collection for solid state drives," IEEE Transactions on Computer-Aided Design of Integrated Circuits and Systems, 2013.
Lehmann, Marc Alexander, "LibLZF," http:/oldhome.schmorp.de/marc/liblzf.html, 2008, 7 pages.
Lu et al., "A Study of Linux File System Evolution," 11th USENIX Conference on File and Storage Technologies (FAST'13), San Jose, CA, Feb. 2013, pp. 31-44.
Lu et al., "Physical Disentanglement in a Container-Based File System," 11th USENIX Symposium on Operating Systems Design and Implementation (OSDI'14), Broomfield, CO, Oct. 2014, pp. 81-96.
S. Maniath, A. Ashok, P. Poornachandran, S. VG, P. S. A. U, and S. Jan, "Deep Learning LSTM based Ransomware Detection," in Proceedings of the 2017 Recent Development in Control, Automation and Power Engineering (RDCAPE'17), Noida, India, Oct. 2017.
Mi et al., "Efficient Management of Idleness in Storage Systems," ACM Transactions on Storage, Jun. 2009, 25 pages, vol. 5, No. 2.
Vrable et al., "BlueSky: A Cloud-Backed File System for the Enterprise," in Proceedings of the 10th USENIX Conference on File and Storage Technologies (FAST'12), San Jose, CA, Feb. 2012, 14 pages.
Microsoft Azure Bandwidth Pricing Details, "https://azure.microsoft.com/en-us/pricing/details/bandwidth/," 2021, 8 pages.
"MSR Cambridge Traces," SNIA Storage Networking Industry Association, http://iotta.snia.org/traces/388, 2010, 1 page (this is from 2023 however).
Neagu, Codrut, "What is SSD TRIM, why is it useful, and how to check whether it is turned on," Digital Citizen, https://www.digitalcitizen.life/simple-questions-what-trim-ssds-why-it-useful, 2018, 18 pages.
NetApp, http://www.shub-internet.org/brad/FreeBSD/postmark.html, 1997.
NVM Express, "NVMe over Fabrics." [Online]. Available: https://nvmexpress.org/wp-content/uploads/NVMe_Over_Fabrics.pdf, Jun. 2016, 7 pages.
Oh et al., "Caching less for better performance: Balancing cache size and update cost of flash memory cache in hybrid storage systems," Proceedings of the 10th USENIX Conference on File and Storage Technologies (FAST'12), 2012, 14 pages.

* cited by examiner

| Name | Description |
|---|---|
| MSR [51] | Storage traces from enterprise servers. |
| FIU [23] | Storage traces from computers at FIU. |
| OLTP [75] | An open-source database engine Shore-MT. |
| IOZone [32] | A benchmark of various file operations. |
| PostMark [53] | A benchmark that emulates mail servers. |

FIG. 16

| Scheme | Storage in Enterprise | | | | | | Storage in University | | | |
|---|---|---|---|---|---|---|---|---|---|---|
| | hm | src | ts | wdev | rsrch | stg | usr | fiu-res | email | online | web | webusers |
| Expanded SSD | 236.9× | 49.5× | 68.8× | 34.4× | 40.8× | 68.1× | 301.9× | 54.7× | 58.3× | 45.4× | 63.3× | 41.4× |
| SSD+HDD | 24.7× | 4.9× | 6.9× | 3.4× | 4.1× | 6.8× | 23.2× | 5.5× | 5.8× | 4.5× | 6.3× | 4.5× |

FIG. 17

RANSOMWARE-AWARE SOLID-STATE DRIVE

CROSS-REFERENCE TO RELATED APPLICATION

This application claims priority to U.S. Provisional Patent Application No. 63/262,505, filed Oct. 14, 2021, the disclosure of which is incorporated by reference herein in its entirety.

BACKGROUND

Employing ransomware typically involves the unauthorized encrypting of user data to be inaccessible as a way of demanding ransom from the user to restore access to the user data. To defend against ransomware attacks, various detection and defense approaches have been proposed. However, ransomware attacks continue to evolve to bypass such approaches.

SUMMARY

The embodiments herein present storage devices and associated procedures that protect against ransomware attacks on solid-state drives (SSDs) through expanding memory capabilities and enhancing security of existing commands. These embodiments, as implemented as devices or systems, through which various techniques, methods, and/or algorithms may be implemented, are referred to as ransomware-aware SSDs (RSSDs). RSSDs may use Non-Volatile Memory Express (NVMe) over Ethernet or other technologies to expand storage capacity in a transparent and secure manner so that data lost or made inaccessible by ransomware can be recovered. RSSDs may also enhance the security support for the trim command in SSDs, as well as enable post-attack analysis and storage forensics.

Accordingly, a first example embodiment may involve a storage device including one or more processors, memory, a host interface connectable to a host device, and a network interface connectable to a backup device. The first example embodiment may also comprise program instructions, stored in the memory, that upon execution by the one or more processors cause the storage device to perform operations comprising: causing data received, by way of the host interface, to be stored in a page of the memory; after storing the data, marking the page as invalid due to input/output operations of the memory; determining a predicted idle time period within which the memory is not expected to be engaged in further input/output operations; determining that a duration of the predicted idle time period exceeds a threshold length; and during the predicted idle time period, transmitting, by way of the network interface, the data to the backup device A second example embodiment may involve causing data received, by way of a host interface and from a host device, to be stored in a page of a memory. The second example embodiment may also involve, after storing the data, marking the page as invalid due to input/output operations of the memory. The second example embodiment may additionally involve determining a predicted idle time period within which the memory is not expected to be engaged in further input/output operations. The second example embodiment may further involve determining that a duration of the predicted idle time period exceeds a threshold length. The second example embodiment may also involve, during the predicted idle time period, transmitting, by way of a network interface, the data to a backup device.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 16 depicts workloads used in evaluating the RSSD, in accordance with example embodiments.

FIG. 17 depicts the storage cost reduction of the RSSD, in comparison with the approaches of expanding the storage capacity locally, in accordance with example embodiments.

DETAILED DESCRIPTION

Figure 1:
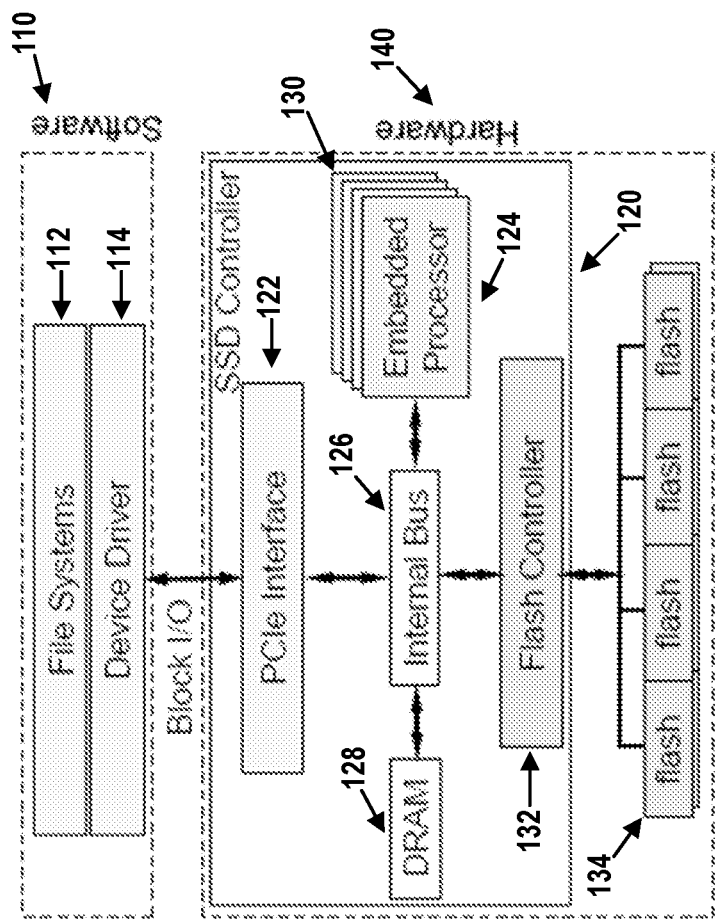
FIG. 1 depicts a block diagram of the system architecture of an SSD, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Although storage systems have been developed and a various storage security studies have been conducted, encryption ransomware continues to impose new challenges and has become one of the biggest cybersecurity threats. Encryption ransomware may stealthily encrypt user data and demand ransom from users to restore their data. Recent studies report that a ransomware attack happens every 14 seconds. Victims may include government agencies, schools, hospitals, police departments, train stations, and personal computers. Each attack may request an average of $8,100 and costs nearly $300,000 in server downtime. These ongoing ransomware outbreaks and their global damage may reflect the fact that the current security design of storage systems falls short of defending against encryption ransomware.

To defend against ransomware attacks, software-based approaches, such as intrusion detection and data backup have been proposed. These detection systems may rely on file access patterns to identify potential attacks. Unfortunately, recent studies show that ransomware attacks may obtain operating system (OS) kernel privileges to terminate or destroy software-based solutions, such as data access control and/or backups. This further shows that current software systems (i.e., OSs and file systems) and existing defense mechanisms cannot sufficiently protect data from ransomware attacks.

An alternative approach may be to develop security mechanisms inside hardware storage devices. This may make the ransomware defense isolated from upper-level software systems. For instance, intrinsic flash properties may be explored to develop in-storage ransomware detection and data recovery mechanisms. Unlike hard disk drives (HDDs), flash-based solid-state drives (SSDs) perform out-of-place updates for each write, as flash pages cannot be written without being erased. Therefore, SSDs may intrinsically retain obsolete data (including the original copies of the data encrypted by ransomware) in flash chips for a period of time until their data is reclaimed by the garbage collector.

However, defenses have been developed based on the assumption that ransomware attackers prefer to attack small but important files and that ransomware attackers rarely consider SSD characteristics. As SSDs have become prevalent in a vast majority of computing platforms due to their improved performance and reduced cost, new ransomware attack models with awareness of flash properties may be developed, creating a new generation of security threats.

II. Flash-Based Solid-State Drives

Flash-based SSDs have been widely used on various computing platforms as a replacement for HDDs. FIG. 1 is a block diagram of the system architecture of an SSD. An SSD may have three major components, including a set of flash memory devices 134, an SSD controller 120 that has embedded processors 130 with dynamic random-access memory (DRAM) 128, and flash controllers 132. Commodity flash-based SSDs may employ a block interface to encapsulate the idiosyncrasies of flash chips, which may give upper-level file systems the impression that both flash-based storage devices and HDDs perform storage operations in the same manner.

When a free flash page is written once, that page may no longer available for future writes until it is erased. However, the erase can only be performed at a block granularity, which may be time-consuming. Thus, writes may be issued to free pages that have been erased in advance (i.e., out-of-place writes) rather than waiting for an expensive erase operation. Garbage collection may be performed later to clean the obsolete data. As each flash block as limited endurance, it may be important for the blocks to age uniformly (i.e., wear leveling). SSDs may employ a flash transition layer (FTL) in their controllers to handle the out-of-place writes, garbage collection, wear leveling, and maintain the logical-to-physical address mapping.

To exploit the massive parallelism and internal bandwidth of flash chips, modern SSDs may integrate general-purpose multi-core processors and DRAM in SSD controllers. These processors may issue input/output (I/O) requests, translate logical addresses to physical addresses, and run garbage collection. DRAM may be used to store the FTL address mapping table and also to cache the I/O data.

III. Possible Attacks

Figure 2:
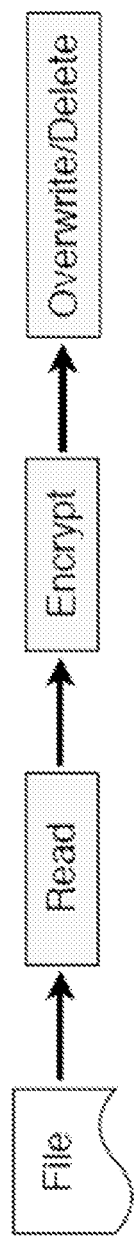
FIG. 2 depicts a typical ransomware attack procedure, in accordance with example embodiments.

FIG. 2 depicts a typical ransomware attack procedure. A ransomware attacker may read the target files and encrypt them. Afterwards, they may either use the encrypted data to overwrite the original data copies or write the encrypted data to new files while deleting the original copies. Ransomware attackers may obtain kernel privileges to terminate software-based detection and defense solutions.

In some examples, intrinsic flash properties (i.e., out-of-place updates and garbage collection as discussed above)

may be exploited to detect ransomware attacks and restore victim data. These restoration techniques may have been developed with the insight that the SSD may naturally preserve the old copies of overridden or deleted files for a period of time before they are reclaimed by the garbage collector. However, these solutions have limitations.

First, these techniques were mainly developed to defend against existing encryption ransomware which assumed the underlying storage devices perform like conventional HDDs. As SSDs have been widely used, ransomware attackers may evolve to update their attack models. Ransomware attackers may take advantage of flash properties, such as garbage collection to achieve their goals. Therefore, it may be highly desirable to proactively prevent new and emerging ransomware attacks.

Second, due to the limited storage capacity, stale data may only be retained for a certain period of time. This may significantly affect storage performance, especially for data-intensive workloads. Additionally, ransomware attackers may take advantage of the limited storage capacity of SSDs to initiate new attacks.

Third, many existing defense solutions do not support post attack analysis, which may prevent the opportunity to learn new attack models and may limit the ability of a computing device to adapt to evolving malware.

A. Garbage Collection (GC) Attack

One attack that may take advantage of flash properties and storage in a conventional storage network is a GC attack. Conventionally, SSDs may over-provision a certain ratio of flash blocks for garbage collection, and once the number of free blocks in the SSD is below a threshold, garbage collection may be triggered to free space. In a GC attack, an attacker may exploit the storage capacity of an SSD and write data to the SSD to occupy the remaining available space, forcing the SSD to trigger garbage collector to release its hold. The hardware-assisted data retention may subsequently fail and ransomware attackers may overwrite data to the SSD. This may cause a large amount of garbage data to be retained and force the garbage collector to delete the data that should be retained.

To hide their behavior, ransomware attacks may follow or mimic patterns of regular storage workloads. A ransomware attacker may write until the threshold at which garbage collection is triggered, and threaten to override the user's data if some form of payment is not made. To obtain a high storage performance, an SSD may hold stale data for a relatively short period of time rather than retaining the stale data for as long as possible, which may increase susceptibility to GC attacks. Given the short period of stale data retention, the user may be exposed to the threat of ransomware attacks. If the user's data is dropped by the garbage collector in the SSD, the ransomware attack will succeed.

Figure 3:
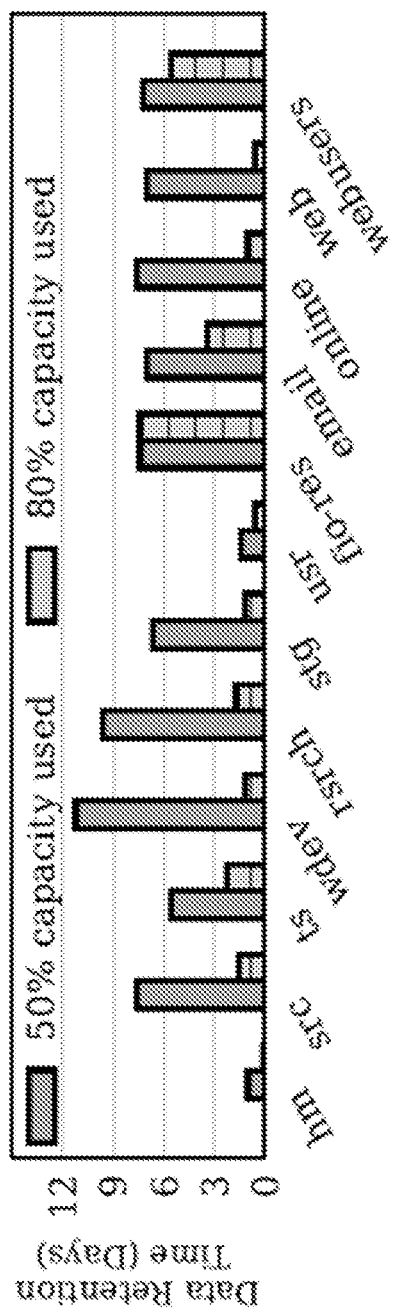
FIG. 3 depicts experimental data collected for data retention time for different applications, in accordance with example embodiments.

To further understand this attack, various storage traces were collected from enterprise servers and universities and replayed in a 1 TB SSD with different capacities being used. Stale data may be retained in time series order for 0.9-11.2 days when 50% of the storage capacity has been used. When less of the storage capacity is available (80% used), the SSD may retain the stale data for only 0.12-7.4 days. In practice, the retention time may be shorter, because regular users may also generate I/O traffic. The GC attack may be fulfilled within a short amount of time. Given a 1 TB SSD with 2.2 GB/s write bandwidth, the SSD may be full in only 7.8 minutes. FIG. 3 depicts experimental results showing data retention time for different applications.

B. Timing Attack

Another possible attack using the conventional configuration is a timing attack. Timing may be critical for both security and performance of SSDs. Ransomware attackers may exploit the intrinsic properties of flash memory and the current hardware-assisted defense approaches. For example, ransomware authors may intentionally slow down the rate at which data is encrypted and the rate at which the victims are notified. Although this may increase the risk of being caught and thwart ransomware authors from quickly gaining results, the input/output patterns generated by the ransomware attacks may be more difficult to predict and identify.

Further, due to performance and limited storage capacity, it may be challenging for SSDs to retain stale data for a long time. To increase the difficulty of being detected by analyzing input/output patterns, ransomware attackers may mimic regular storage operations from common applications. By the time that the victim notices, the victim's data may have already been collected by the garbage collector, making the SSD protection in vain.

C. Trimming Attack

Ransomware authors may also exploit the trim command, which is available in modern SSDs, to initiate new attacks. The trim command was introduced in commodity SSDs to allow the OS to inform the SSD of which data blocks are no longer in use and can be erased. And the SSD may simply reclaim them in its garbage collector. This may reduce the garbage collection overhead as the SSD has fewer pages to move during its garbage collection procedure. An encryption ransomware attacker may leverage this command to speed up reclaiming the original data blocks after they are encrypted. Specifically, these blocks may be erased at the next garbage collection. With write-intensive workloads, this may happen within a few seconds. In this case, the SSD may store no copies of the data encrypted by the ransomware. The trim attack may be feasible, because ransomware can obtain the OS kernel privilege and simply execute the trim command.

D. Implementing the Attacks

Proof-of-concept prototypes for these new attacks were implemented. These attacks may be implemented using only a few lines of code. For example, the GC attack was implemented with less than ten lines of code, the trimming attack may require insertion of only a few lines of code to call trim commands in the samples, and the timing attack may only need a timer to control the window notifications. These new attacks may either bypass state-of-the-art detection approaches and/or cause at least part of the data encrypted by the ransomware to be unrecoverable.

Figure 4:
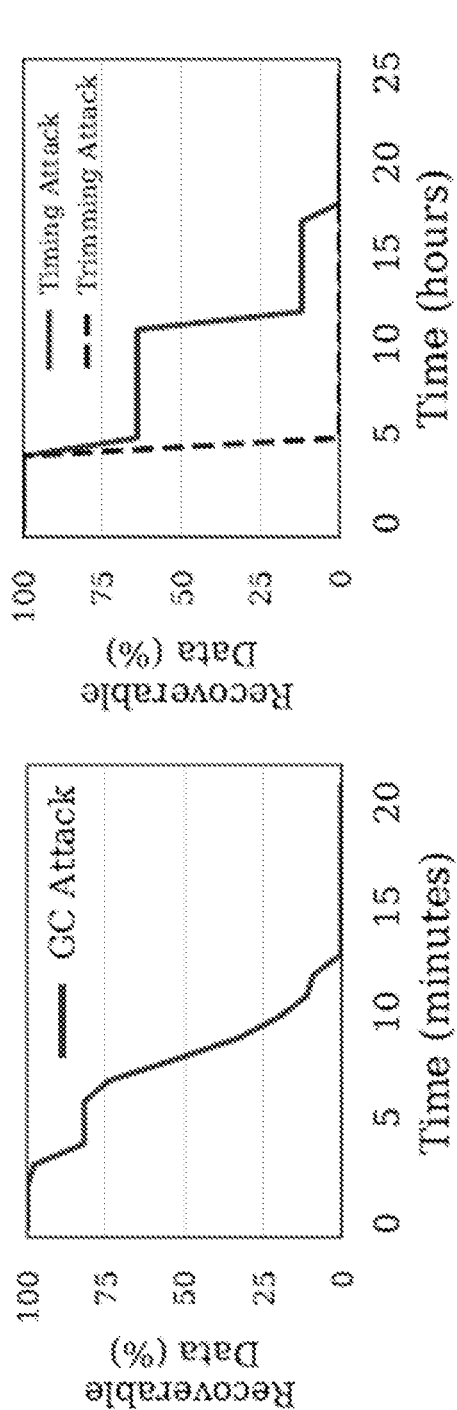
FIG. 4 depicts the results of ransomware attack implementations, in accordance with example embodiments.

The effectiveness of the new attacks was verified using a 1 TB SSD. Half the capacity of the SSD was occupied with valid files. The ransomware sample, WannaCry, was run to encrypt some of the files (e.g., 128 GB worth). Afterwards, the garbage collection, timing, and trimming attacks were implemented and the amount of modified data that could be recovered from the SSD after a certain period of time was measured. FIG. 4 depicts the results of the attack implementations.

For example, the GC attack was implemented through generating garbage data. Shortly after, garbage collection was triggered and all the victim data is collected by the garbage collector within a few minutes (see FIG. 4 part a). After initiating the timing and trimming attacks, the storage traces were run with workload transaction processing performance council benchmark C (TPCC) to emulate regular storage operations. After about four hours, the garbage collection was triggered, and the victim data may be reclaimed eventually in the SSD. As shown in FIG. 4 part b, the trimming attack accelerates the loss of victim data as it has notified the SSD of which flash blocks may be reclaimed.

IV. Proposed Ransomware-Aware SSD

A ransomware-aware SSD (RSSD) may have three goals including (1) being able to defend against the ransomware attacks identified above (e.g., GC attack, timing attack, and trimming attack); (2) having minimal negative impact on the storage performance without significant hardware cost (since both GC attack and trimming attack are taking advantage of the trade-offs between performance and security); and (3) enabling post-attack analysis, assisting digital investigations, and improving ransomware evolution. These goals may be achieved using the proposed RSSD, through implementing the following key ideas.

Figure 5:
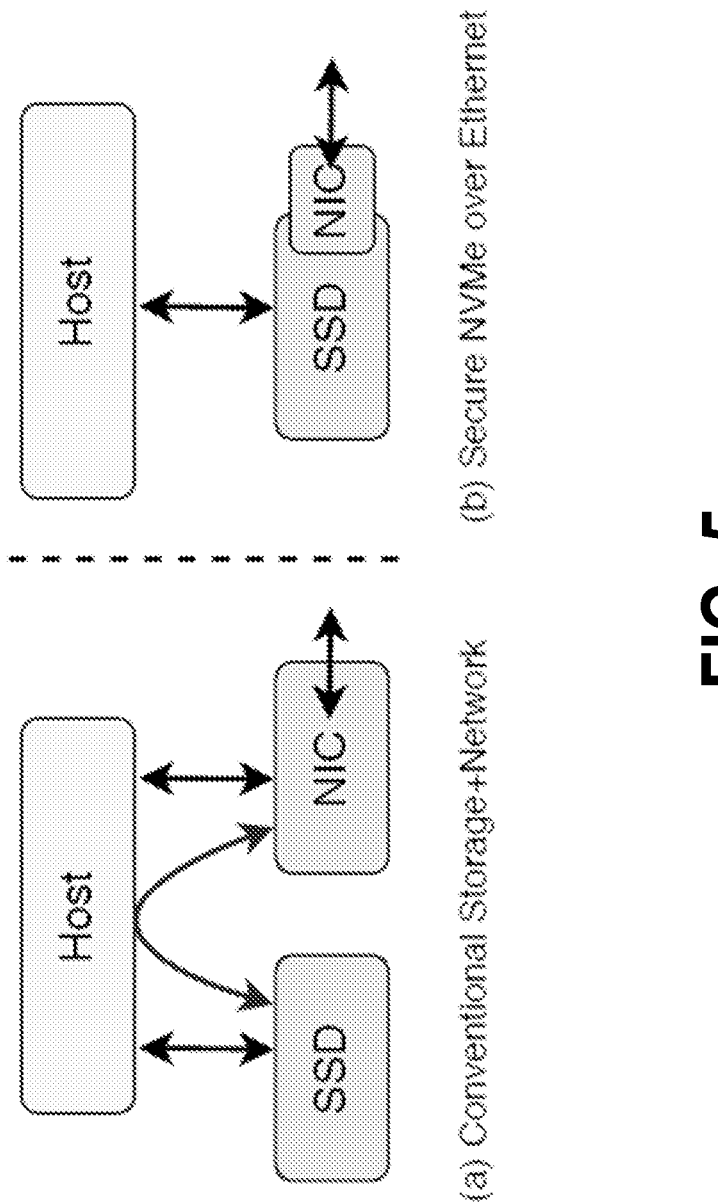
FIG. 5 illustrates the difference in architecture between a conventional SSD and the proposed SSD, in accordance with example embodiments.

Extend Local SSD with Secure NVMe over Ethernet: To defend against GC attack and timing attack, the RSSD was developed with secure NVMe over Ethernet to extend the local SSD. Unlike conventional ways of communicating with a remote cloud/server via host network cards, the Ethernet network architecture was integrated into the SSD controller, making the network hardware isolated from the host hardware. FIG. 5 illustrates the difference in architecture between a conventional SSD and the proposed SSD.

Enhance the Security Support for the trim command: To defend against trimming attacks, the trim command was enhanced in the SSD firmware. This was developed based on the insight that the trim command is attractive for ransomware attackers as it will help them bypass the existing defense solutions by directly notifying SSDs of the flash blocks that they want to erase. Upon receiving trim commands, the RSSD may track trim history, retain the potential victim data, and assign free flash blocks to the corresponding process.

Data recovery and Post-Attack Analysis: Transparently retaining stale data in both local SSD and/or a remote cloud/server in time order may enable data recovery by retrieving old versions of updated data. The RSSD may enable users to build trusted evidence chains for attack investigations by tracking all the received storage operations in the SSD controller. As these traces may eventually be available in the remote cloud/server, it may facilitate the post-attack analysis with powerful computing resources.

Since an SSD has no knowledge about semantic information from upper-level software, the invalid flash pages in the SSD may be retained. Such a strategy may retain all the data that would be locked by encryption ransomware. However, this may introduce additional overhead to the SSD. Thus, the retention time of stale data may be shortened or the SSD may be run until it is full. To address this challenge, an alternative approach may be to expand the local storage capacity by transferring the retained data to a remote cloud or storage servers. However, using the conventional computer architecture with a decoupled storage and network, the data would need to be read from the SSD to the host machine, then transferred through the network card, as shown in FIG. 5 part a. Adversaries with kernel privileges may easily terminate this process or destroy the user data.

Ideally, the local storage capacity may be increased with low cost while ensuring data security. To this end, NVMe over Fabrics (NVMoF) may be used to enable secure data transfer to the remote cloud or storage servers. The network component may be integrated into the SSD controller. Thus, the SSD may be able to transfer data without host involvement and the network module may be hardware isolated (See FIG. 5 part b).

An RSSD may be a practical solution for a few reasons. For example, NVMoF has become a standard protocol for NVMe devices, which has driven the recent development of real products. Additionally, following industry specifications, there may be no technical barrier to hinder SSD vendors from implementing NVMoF in real products. Further, NVMoF does not introduce much hardware cost to existing SSD manufacturing (i.e., less than 5% area overhead for supporting the Ethernet interface). And the integrated Ethernet network controller may only add 5.7%-19.2% more power consumption compared to a commodity SSD. Also, considering that each ransomware attack may ask for an average of $8,100, it may be worthwhile to develop a thorough solution.

V. Architecture Design Details of RSSD

Compressing stale data in the SSD may significantly reduce the storage space and further extend the data retention time. However, the SSD may still not be able to defend against a GC attack and/or a timing attack, due to the limited local storage capacity. Ideally, the local storage may be expanded with virtually unlimited remote storage in a secure and cost-effective way.

Figure 6:
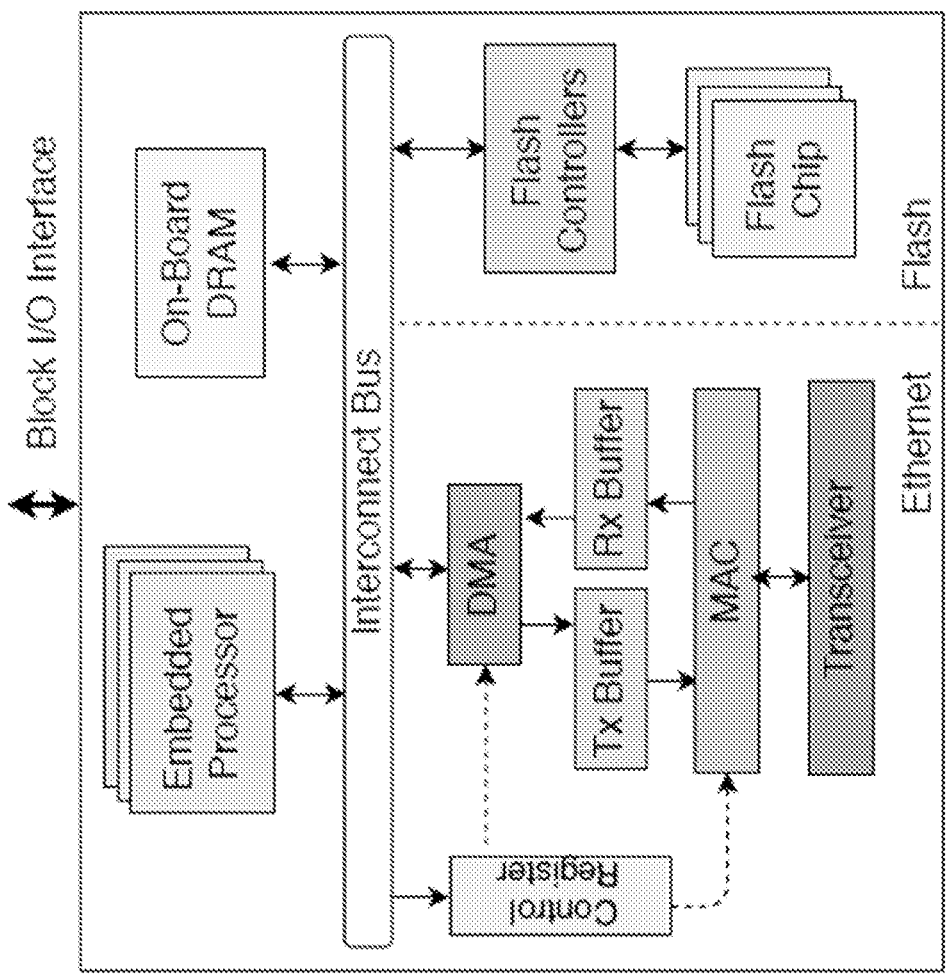
FIG. 6 depicts the architecture of an RSSD, in accordance with example embodiments.

The RSSD may consist of an SSD controller with NVMe over Ethernet (NVMe-oE). FIG. 6 depicts the architecture of the NVMe over Ethernet. As the network module is integrated into the SSD controller under the block I/O interface, it is not exposed to the host machine. The network module utilizes Direct Memory Access (DMA) to transfer data in flash blocks from the on-board DRAM of the SSD controller to the transmit (Tx) buffer queues, as well as to transfer data from the receive (Rx) buffer queues into flash blocks.

The network module has a unique Media Access Control (MAC) address and may be configured with an Internet Protocol (IP) address to communicate with other networked devices. Although NVMe-oE may be hardware isolated in an RSSD, its IP address and connected IPs may be configured by issuing NVMe commands enabled with modern NVMe protocols. For example, end users of an RSSD may configure the IP addresses of remote servers, domain names of the remote servers, or the access URLs of remote cloud storage services in the SSD. Alternatively or additionally, a MAC address of a remote server on the same logical local area network segment may be configured. In sum, the network address(es) of the RSSD and/or the remote servers to which the RSSD sends copies of data may be configured on the RSSD.

Note that the initial configuration procedure may need to be conducted in a secure environment. Since the configuration does not happen frequently, it may be disabled at runtime to avoid attacks. An RSSD may transfer the compressed stale data and tracked read/trim operations to the remote cloud or servers at flash-block granularity, after which these flash blocks may be erased by the garbage collector.

An RSSD may conduct the data transfer at idle I/O cycles to alleviate its impact on the regular storage operations. The RSSD may use a simple yet effective prediction model to predict the idle time based on the last interval between I/O requests. Specifically, it may predict the next idle time ($t_i^{predict}$) based on the last interval of time between I/O requests ($t_{i-1}^{real}$) with $t_i^{predict} = \alpha * t_{i-1}^{real} + (1-\alpha) * t_{i-1}^{predict}$, where $t_{i-1}^{predict}$ refers to the idle time of the last prediction and a refers to the exponential smoothing parameter. The exponential smoothing method ($\alpha$=0.5 in RSSD) was used to predict idle time. Once $t_i^{predict}$ is larger than a defined threshold (10 milliseconds by default), the RSSD may first send the oldest compressed blocks or real time transfer (RTT) blocks to remote cloud/servers.

To ensure secure data transfer, an RSSD may have data encryption of each flash block being transferred. It may use the 128-bit Advanced Encryption Standard (AES) scheme, which may be used in modern SSD controllers. The encryption key may be stored on the SSD firmware. To alleviate any negative impact on regular storage performance, the RSSD may suspend the data transfer upon I/O requests. However, when a flash block is being transferred, the RSSD may finish it in the background.

Note that the RSSD may not affect the functionality of regular storage operations, because the RSSD only moves compressed invalid pages or RTT blocks to the remote cloud/server, and these flash blocks may not be accessed by regular applications.

A. Managing Data in Remote Cloud/Server

The RSSD may organize the compressed data blocks and RTT blocks in time order, and they may be transferred to the remote cloud/server following the same order. Thus, they may be managed in a log-structured manner. Objects may be used to store each flash block in cloud storage services (e.g., Amazon S3), and a timestamp may be used when the flash block is being transferred to name the object. As for the in-house storage servers, log-structured file systems such as Flash-Friendly File System (F2FS) may be used to store received flash blocks. Because the remote cloud and/or in-house servers may be connected via a hardware-isolated NVMe-oE, they may be protected from potential malware attacks.

Storing retained stale data and operation logs in a remote cloud/server may have several benefits. First, the cloud/server may have much larger storage capacity compared to a SSD, and the larger storage capacity may serve to extend the local storage capacity. In this manner, a victim's data may be able to be retained for as long as possible, while having minimal impact on local storage performance. Second, the cloud/server may have much more powerful computing resources, which may facilitate data recovery and post-attack analysis. For example, users may be able to apply advanced machine learning models in the cloud/server to learn and detect new ransomware attacks, which may be difficult or impossible in local storage. Third, the cloud may provide flexibility of increasing the storage capacity at a much lower cost compared to local storage.

However, using NVMe-oE to defend against encryption ransomware may not be very straightforward. First, which data to transfer to the remote cloud/server may need to be decided. The retained data and tracked read/trim operations in the local SSD may be transferred to a remote cloud/server as this information may not be frequently accessed in local storage. Second, this data may be transferred in a time order (i.e., the oldest data may be transferred to the remote cloud/servers first), which may facilitate data recovery procedure and post-attack analysis. Third, the data being transferred may be compressed to reduce the performance overhead and remote storage cost, as well as being encrypted for communication security. To address these challenges, the regular SSD may be redesigned using data structures.

B. Data Structures in SSD Firmware

Figure 7:
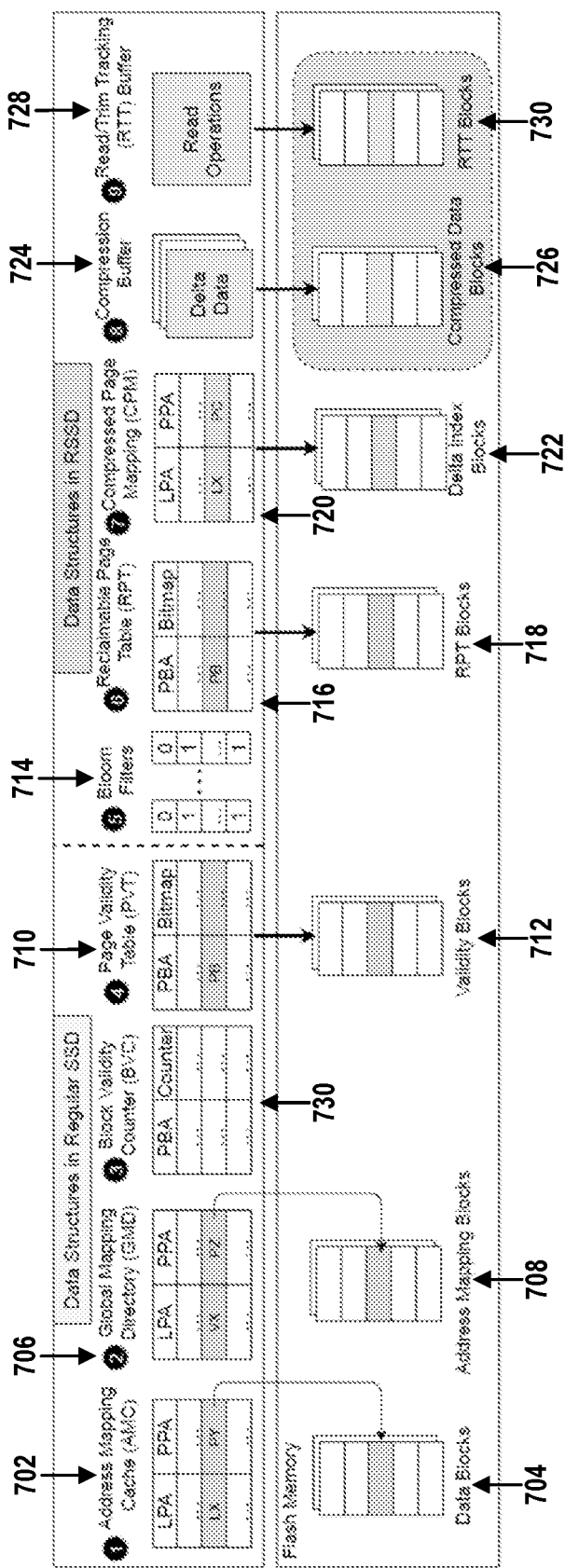
FIG. 7 depicts data structures used in a conventional SSD controller and the SSD controller of the RSSD, in accordance with example embodiments.

FIG. 7 depicts data structures used in a conventional SSD controller and an SSD controller of the RSSD. To support out-of-place updates, the SSD may need to maintain an address mapping table for translating the logical page address (LPA) of a storage request into a physical page address (PPA). The address mapping table may be cached in the DRAM of the SSD controller for performance (e.g., see (1) address mapping cache (AMC) 702 in FIG. 7). The entire address mapping table may be stored in the flash chips as a set of transition pages, and their locations may be tracked in (2) global mapping directory (GMD) 706. With an out-of-place update mechanism, any data update or delete may cause the old version of a flash page to be invalidated. Therefore, garbage collector may be needed to free the invalid pages and to reuse them for new updates/writes. In a regular SSD, the garbage collector may first select the candidate flash blocks (e.g., those flash blocks which have the least number of valid pages), migrate the valid pages of the selected blocks to a free block, erase the selected flash blocks at block granularity, and mark them as free blocks. To assist the garbage collector, the SSD controller may have (3) block validity counter 730 (BVC) table that tracks the number of valid pages for each block. It may also maintain a (4) page validity table 710 (PVT) that uses bitmaps to track which pages are valid in a flash block. During the garbage collection, the address mapping table may be updated accordingly when a valid page is copied from one flash block to another flash block. In an RSSD, the flash blocks may be erased by setting their corresponding BVC 730 to zeros, as well as their Reclaimable Page Table 716 (RPT) to indicate these pages can be reclaimed.

C. Retaining Stale Data in Time Order

In order to defend against new ransomware attacks, the RSSD may conservatively retain all invalid flash pages in time order. The RSSD may employ minor firmware modifications by introducing five data structures to assist it in fulfilling the essential functions, as shown in FIG. 7. Each of the data structures may consume minimal memory resources in the SSD controller.

Instead of tracking the timestamp (4 bytes each) of each flash page when it becomes invalid, the RSSD may use Bloom filters to index invalid pages. A Bloom filter is a type of data structure that may be used to more rapidly obtain the location of data in storage. A Bloom filter may contain multiple elements, and a query to the filter for whether a certain element is in the Bloom filter may return "possibly in set" or "definitely not in set."

In this case, the RSSD may organize multiple Bloom filters in time order, and each Bloom filter may represent one time window or epoch, such that the RSSD may maintain the ordering of invalid data versions. Specifically, once a flash page is invalidated, its PPA may be inserted into the most recently created Bloom filter. Once the number of PPAs in the Bloom filter reaches a threshold, the Bloom filter may become inactive and a new Bloom filter may be created. RSSD may reuse the created Bloom filters in the order of their creation.

When the garbage collector reclaims an invalid page, it may compare the most recently created Bloom filter to the oldest created Bloom filter. If the PPA of an invalid page is found in one of the Bloom filters, the invalid page may be retained and compressed. And each Bloom filter may be associated with dedicated data blocks for retaining the compressed flash pages that become invalid in that epoch. Although Bloom filters may have false positives, these false positives may not contribute incorrect behaviors. This is because even though an invalid flash may be may be reclaimed, retaining it in the SSD conservatively may not generate much negative impact. Bloom filters may not have false negatives, and invalid pages that may be retained may not be reclaimed by mistake.

D. Packing Retained Stale Data with Extended Garbage Collection

As mentioned above, retaining all the stale data may consume a large amount of storage space and decrease storage performance. Instead, RSSD may enable delta compression for retained stale data, based on the observation that only a small portion of data may be changed in a page update. An RSSD may have delta buffers 724 to group deltas (update difference) at page granularity. Once a delta buffer is full, the RSSD may write it back to the flash blocks in the storage device and update the mapping table for those compressed pages (CPM 720) for future data retrieval. For those invalid flash pages that have been compressed, the RSSD may also update the RPT 718 to indicate that they can be reclaimed by the garbage collector. Beyond retaining updates in a time order, the RSSD may also track the read operations with read tracking buffer 728 for post-attack analysis. How the RSSD uses these data structures to fulfill its goals is discussed later.

The RSSD may modify the garbage collection procedure of the SSD to compact the invalid pages and clean them for free space. Instead of reclaiming the free space immediately during garbage collection, the RSSD may reclaim invalid pages after they have been compressed. The compressed stale data may be reclaimed after they have been transferred to the remote cloud/server. The RSSD may use delta compression during garbage collection operations, during which it may compute the difference between two versions of the page mapped to the same LPA and use the difference as the delta to represent the invalid page. The RSSD may use the latest data version mapped to the same LPA as the reference. Because the RSSD may retain the stale data in time order, a reference version of the flash page may never be reclaimed before its deltas.

Figure 8:
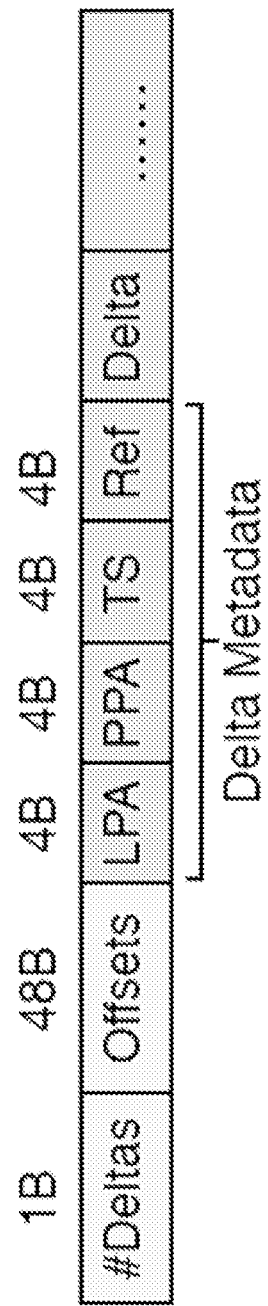
FIG. 8 depicts a delta page, in accordance with example embodiments.

The RSSD may use a compression buffer 724 to coalesce deltas in a page. FIG. 8 depicts a delta page. The header of each delta page may include the number of deltas and the byte offset of each delta. And each delta item may have metadata and a delta value. The RSSD may use the metadata to index each compressed flash page, which may include (1) the LPA mapped to this compressed page; (2) the PPA that points to the previous data version mapped to the same LPA (i.e., back pointer); (3) the write timestamp of this data version; and (4) the write timestamp of the reference flash page. Once an invalid page is compressed, the RSSD may set the RPT 716 to indicate that it can be reclaimed. Thanks to the embedded processors available in the SSD controller, the RSSD may execute the lightweight delta compression with the garbage collector inside the storage device. When the compression buffer is full or when its available space cannot host a newly compressed page, the RSSD may write it to the reserved flash blocks. The detailed garbage collection procedure of the RSSD is depicted in Algorithm 1.

Algorithm 1: Garbage Collection Procedure of RSSD
  Check (3) block validity counter
  Select a candidate block with least number of valid pages
  Identify valid/invalid pages by checking (4) PVT
  For each valid page do
    Migrate this page to a free page
    Update the address mapping table 702
  For each invalid page do
    Check the reclaimable page table 716
    If this page is reclaimable then
      Discard this page (compressed or expired)
    Else
      Check if this page is in the Bloom filters 714
      If this page misses all the Bloom filters then
        Discard this page as it has been expired
      Else
        Read this page and its OOB metadata
        Read all the older and unexpired data versions
        Read the latest version mapped to this LPA
        Compress the oldest versions with the ref. version
        Write deltas to delta blocks with metadata
        Update the head of delta page chain CPM 720
        Set compressed pages as reclaimable in RPT 716
  Erase the selected flash block
End of Algorithm 1

An RSSD may use an address mapping table for those compressed invalid pages (CPM 720). With the back pointer in the delta metadata, the RSSD may maintain the chain of all invalid pages mapped to the same LPA. As each physical flash page may have a reserved out-of-band (OOB) metadata (16-64 bytes), each physical flash page may be used to store (1) the LPA mapped to this physical flash page; (2) the previous PPA mapped to the same LPA; (3) the timestamp when the flash page is written. The RSSD may access the OOB metadata for its garbage collection (see Algorithm 1).

E. Tracking Read and Trim Operations in SSD

Beyond retaining the invalid pages, an RSSD may also track the read and trim operations received in the SSD controller for post-attack analysis. The RSSD may log these operations in a log-structured manner. Each log item may have 8 bytes (4 bytes for each timestamp, 4 bytes for each LPA). The RSSD may track the read and trim operations in separate tracking buffer (1 MB by default) and flash blocks. Once the buffer is full, it may be written into corresponding flash blocks. Unlike previous ransomware detection approaches, the RSSD may track all the storage operations in the storage device, which may also be hardware isolated and provide the possibility of building a trusted evidence chain after malware attacks.

Note that the RSSD may not explicitly track the write operations, because it may have tracked the write timestamp of each flash page within the OOB as discussed above. As the RSSD may utilize hardware-assisted approaches to log the read, write, and trim operations issued to the SSD in time order, it may be able to reconstruct the entire attack procedure for further investigation.

It is worth noting that such a functionality of the RSSD may facilitate storage forensics analysis. First, it may enable the reconstruction of the event chain that is responsible for incidents. The previous physical page address stored in the OOB metadata of each page may be used to reverse an invalid page to its previous versions. In this fashion, the evidence chain of the storage operations may be easily build upon. Second, since the RSSD may never miss an event, those events representing the occurrence of anti-forensics may also be recorded. Therefore, the RSSD may be capable of detecting anti-forensics. Third, since the chronology of events is available, only analyzing data involved in those events may be needed to be done, thereby reducing the cost of building the trusted evidence chain as discussed above.

F. Defending Against Attacks

With the techniques discussed above, the RSSD may defend against GC attacks, timing attacks, and trimming attacks as follows.

Defend against GC attacks. As attackers initiate a GC attack by writing data to the SSD, the victim data that has been encrypted by ransomware may be erased in regular SSDs. However, with RSSD, the original copies of the victim data may be transferred to the remote cloud/server via hardware-isolated NVMe-oE. Since the remote cloud/server may have much larger storage capacity, the RSSD may retain the victim data for a long time with lower cost.

Defend against timing attacks. Although ransomware attackers may intentionally slow down their attack pace, the victim data may not be physically erased until the data has been transferred to the remote cloud/server. As the cloud storage services may offer extremely low storage cost, it may be reasonable to retain victim data until users confirm that no ransomware attack has happened or confirm that the data integrity is ensured. As the NVMe-oE may be hardware isolated in RSSD, it may be hard for adversaries to exploit system vulnerabilities to terminate or hijack the network connection with the remote cloud/server.

In the worst-case scenario, the network connection with the remote cloud/server may be broken, RSSD may best utilize the local storage capacity with data compression to retain the stale data locally until the storage device is full.

Defend against trimming attacks. RSSD may keep the trim command in use in the SSD and port it to systems software. However, in the SSD controller of RSSD, the operations may be modified internally and implemented in an alternative way. The RSSD may track the trim commands in the SSD controller and record the corresponding flash block addresses. Instead of reclaiming these flash blocks, the RSSD may retain them in the SSD. The RSSD may allocate new flash blocks and remap the addresses touched by the trim command to these newly allocated blocks by setting the (1) AMC. It may therefore give attackers the illusion that the trim command has been successfully executed. As for the data being trimmed, The RSSD may mark them as invalid and insert their PPAs into the recently created (5) Bloom filter such that they may be compressed, encrypted, and transferred to the remote cloud or storage servers.

VI. RSSD Processes

The RSSD may implement various processes to serve storage operations from host machines and to perform its internal operations. As the RSSD is a firmware-based solution, it may not require modifications to upper-level applications or the host systems software such as OSs and file systems.

Read Operation. Upon receiving a read request, the RSSD may first check (1) AMC for the address translation. If the mapping entry is in (1) AMC, the RSSD may get the PPA for the read request and serve the data page. If not, the RSSD may look up (2) GMD to locate the mapping entry in the address-mapping page, and place the corresponding entry in (1) AMC. The read operation may be placed in (9) RTT buffer.

Write Operation. Upon a write request, the RSSD may conduct the same address translation procedure as for read requests. For a cache hit in (1) AMC, the RSSD may write data to a new flash page and update the corresponding mapping entry in (1) AMC with the new PPA. If it is a miss, the RSSD may create a new mapping entry with the new PPA in the (1) AMC.

Trim Operation. Upon receiving a trim command, the RSSD may conduct the address translation as discussed above to locate the corresponding flash block X. It may also allocate a free flash block Y. And then, the RSSD may read the OOB of each flash page in the block X to find its LPA, and map each LPA to the flash page in Y one by one by updating the mapping entries in (1) AMC. This may give the host program an impression that the trim operation is fulfilled. However internally, the RSSD may retain the flash block X by inserting its PPAs into the (5) Bloom filter. Thus, if the trim was issued by a ransomware attacker, the RSSD may still have the ability to recover the victim data.

Garbage Collection Operation and Data Transfer. A garbage collection operation in an SSD may be triggered when the free space of the SSD is below a threshold (15% of the total storage capacity). The RSSD may use the greedy algorithm to select the candidate flash block who has the least number of valid pages. The garbage collection procedure of the RSSD follows the Algorithm 1. The RSSD may utilize idle I/O cycles to transfer compressed stale data and RTT blocks to the remote cloud/server, following the steps described above.

VII. Data Recovery and Post-Attack Analysis

The RSSD may facilitate data recovery and post-attack analysis upon malware attacks, as the RSSD may retain stale data and logs of storage operations across the local SSD and remote cloud/server.

Data Recovery. The RSSD may utilize three sources of retained stale data for its data recovery: (1) the invalid pages that have not been compressed yet; (2) the invalid pages that have been compressed; (3) the compressed stale data that has been transferred to the remote cloud/server. Upon data recovery, the RSSD may roll back the storage states to a previous version for a specific LPA or a set of LPAs. Given an LPA, the RSSD may first retrieve its previous version by checking the retained stale data, then write back the retrieved version to the SSD like a new update. After that, the RSSD may invalidate the latest data version and modify the corresponding address mapping.

Specifically, to retrieve a previous version of an LPA at specific timestamp, the RSSD may first check its latest version with the (1) address mapping table and use the OOB metadata to pinpoint previous versions one by one. If the previous version at a specific timestamp cannot be found, the RSSD may check the CPM 720 (in FIG. 7) to pinpoint the compressed versions. Following the chain built with the delta metadata, the RSSD may traverse back to previous versions and check its timestamp until it finds the demanded version. If the RSSD cannot find the version in the local SSD, the RSSD may check the flash blocks stored in the remote cloud/server. Since each compressed flash page may have its own metadata (see FIG. 8), and the flash blocks in the remote cloud/server may be transferred and stored in time order, the flash blocks may be scanned to identify the previous versions of an LPA.

Post-attack Analysis. To assist the investigation of an attack, the RSSD may enable trusted users to reconstruct the original sequence of events that led to the incident (i.e., storage forensics). Unlike existing forensics techniques that execute under the OS control, the RSSD may collect storage operations in the SSD firmware, which is hardware isolated from systems software. Since the RSSD may have tracked the read/trim operations with RTT blocks 730 (in FIG. 7), the RSSD may reproduce the storage operations that happened to the SSD in the past, following the time order in which these operations were issued. Having a large portion of the operation log being available in the remote cloud or servers may enable users to utilize their powerful computing resources to conduct advanced analysis such as the machine learning based analysis for ransomware detection and post-attack investigation.

The RSSD may tolerate power outages and system crashes. This is because most of the data structures for the RSSD may be used to cache index/metadata information for fast access, and they may be reconstructed by scanning the OOB metadata of flash blocks. And many SSDs may have deployed battery-backed DRAM, capacitors, or Power Loss Protection mechanisms to ensure the durability of the buffered data in the SSD controller.

VIII. RSSD Implementation

The RSSD was implemented with a Cosmos+ OpenSSD FPGA development board that supports NVMe protocol and NVMe-oE. This board includes an ARM Cortex-A9 Dual-core and 1 GB DRAM. The board also has a 1 TB flash memory. Fifteen percent of the capacity was reserved as over-provisioning space by default. In the SSD, each flash page may be 4 KB with 12 bytes of OOB metadata, and each flash block may have 256 pages. Besides supporting the basic I/O requests such as read, write, and trim commands, new NVMe commands were defined to enable users to configure the network connections and data encryption. To support data recovery in the RSSD and to add a state query engine into the SSD firmware for locating retained stale data, the NVMe command interpreter was slightly modified. Sixty-four MB of DRAM in the SSD controller was reserved for Bloom filters and the data compression buffer. Four MB of DRAM in the SSD controller was used for logging read and trim operations, respectively. Page-level address translation was used for mapping in the RSSD. Delta compression was implemented with the LZF algorithm for its high performance. An in-house server was used as the remote server and connected to the OpenSSD board via NVMe over Ethernet (1 GigE). The server had a 16-core Skylake based Intel CPU running at 3.6 GHz with 64 GB of DRAM and 10 TB HDD. The log-structured file system F2FS was deployed on the remote server to manage the transferred flash blocks.

IX. Evaluation

The evaluation demonstrated that the RSSD may (1) retain the stale data for a much longer time than other state-of-the-art approaches, (2) have minimal negative impact on storage performance and SSD lifetime, (3) perform fast data recovery after ransomware attacks, and (4) conduct efficient post-attack analysis by building a comprehensive chain of I/O operations.

A. Experimental Setup

Various real-world storage traces, file system benchmarks, and data-intensive workloads were used to evaluate the RSSD which are listed in FIG. 16. They include (1) a set of storage traces collected on storage servers for different applications at Microsoft Research Cambridge; (2) a set of storage traces collected from computers at FIU; (3) an open-source database engine, Shore-MT, running with various transaction benchmarks that include TPCC, transaction processing performance council benchmark B (TPCB), and telecommunication application transaction processing benchmark (TATP); (4) IOZone benchmark consisted of a variety of file operations; (5) PostMark benchmark that emulates the I/O operations generated by a mail server. Before each experiment, the SSD may be warmed up by randomly running these workloads.

The RSSD may be compared with three SSDs: (1) an SSD that retains stale data in time order (LocalSSD), (2) LocalSSD with delta compression (LocalSSD+Compression), and (3) a regular SSD that does not intentionally retain data (Regular SSD).

B. Impact on Data Retention Time

The impact of RSSD on the data retention time may be evaluated first, with MSR and FIU storage traces. In order to evaluate the capability of retaining data before filling up the SSD, each trace may be prolonged to ten months by duplicating it a hundred times. Since MSR and FIU traces may not contain real data content, five may be used as the default compression ratio, as determined experimentally.

Figure 9:
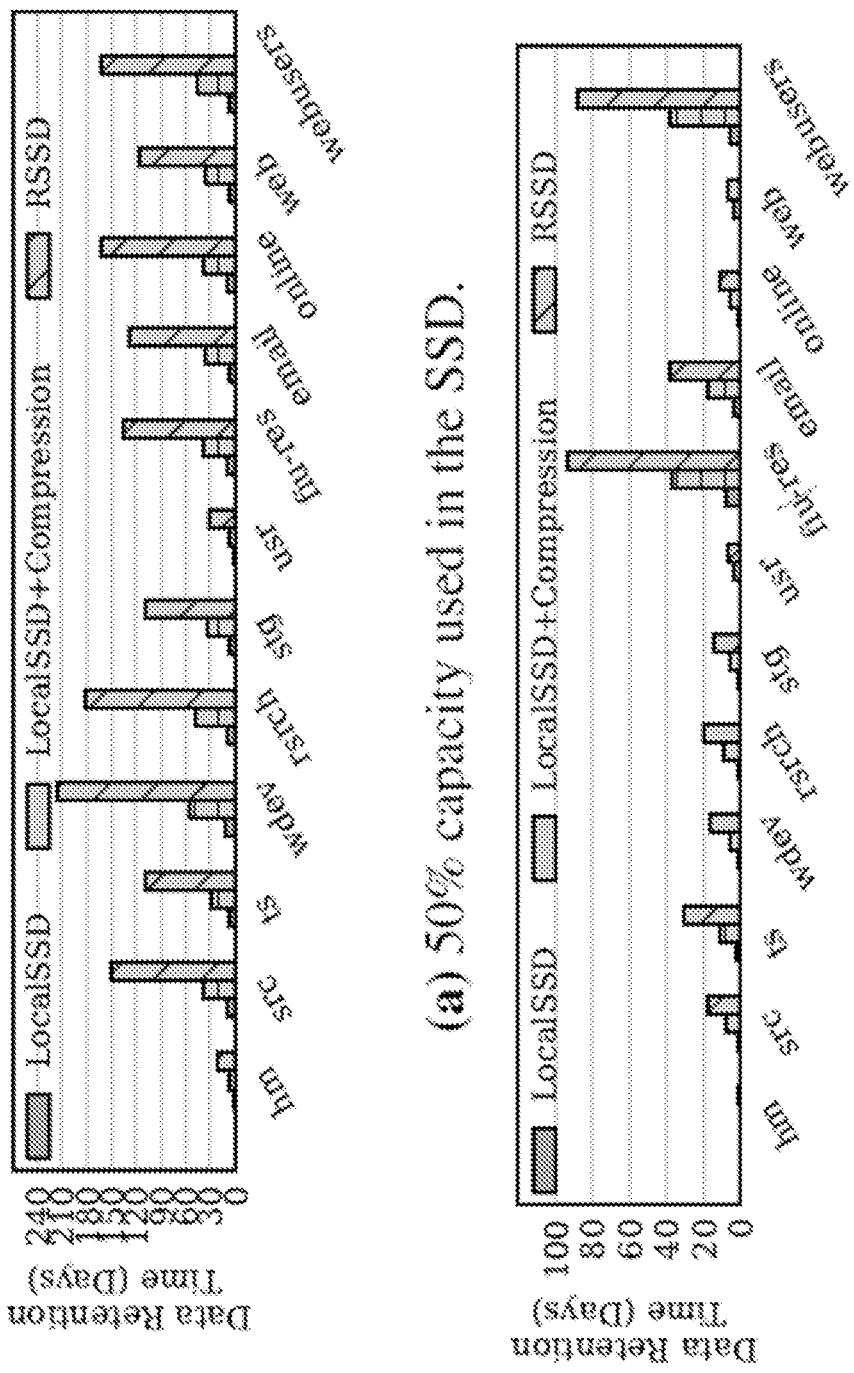
FIG. 9 depicts the data retention time of running different storage workloads under various capacity utilizations, in accordance with example embodiments.

As expected, the data retention time may be determined by both storage utilization and workload patterns. FIG. 9 depicts the data retention time of running different storage workloads under various capacity utilizations (50% and 80%). LocalSSD retains the stale data for 0.9-11.2 days and for 0.12-7.4 days under 50% and 80% capacity utilization, respectively. With delta compression enabled, LocalSSD can extend the data retention time by up to 6.4×. The RSSD may further extend the data retention time by 2.1-4.3×, compared to LocalSSD+Compression. As the compression ratio is decreased, a similar trend on the improvement of data retention time may be demonstrated (not shown in the figure). As shown in FIG. 9, the RSSD may retain data for up to 215 days by gradually transferring packed stale data to the remote server, such that the local SSD has more free space. Note that the RSSD may only transfer stale data to remote cloud/server and may eventually be completely filled with valid user data.

C. Impact on Storage Performance

Figure 10:
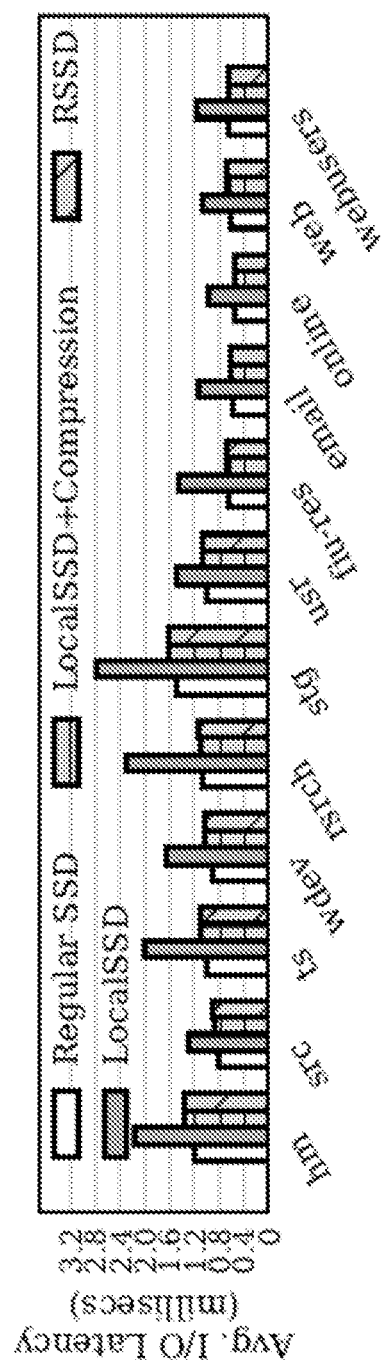
FIG. 10 depicts the results of evaluating the impact of the RSSD on storage performance, in accordance with example embodiments.

The impact of the RSSD on the storage performance was also evaluated. The SSD utilization was set as 80%. FIG. 10 depicts the results of the evaluation. Compared to a regular SSD that does not intentionally retain data, LocalSSD may increase the I/O response time by 1.9×, due to intensive garbage collection operations. This overhead may be reduced by LocalSSD+Compression, as data compression may be used to compact the retained invalid pages and free more flash blocks. In comparison to the LocalSSD+Compression implementation, the RSSD may not introduce much performance overhead (0.77% on average), when it gradually utilizes idle I/O cycles to transfer packed stale data to the remote server. This may indicate the NVMe-oE implementation of RSSD does not affect regular storage operations. Gradually utilizing idle I/O cycles to transfer packed stale data to the remote server may also free storage space for the local SSD and alleviate the garbage collection overhead.

Figure 11:
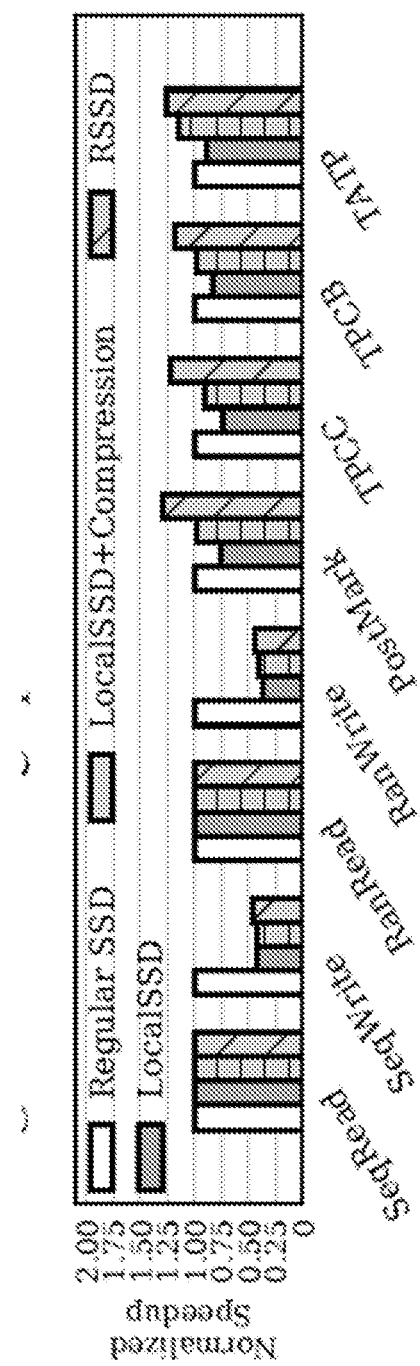
FIG. 11 depicts a local storage performance comparison of various types of SSDs, in accordance with example embodiments.

The RSSD may also be evaluated using IOZone, PostMark, and online transaction processing (OLTP) workloads that generate real data. To show the effectiveness of data compression used in the RSSD, the regular SSD which does not intentionally retain stale data may be used as the baseline. IOZone benchmark may be used to generate various storage workloads that include sequential/random read and write. FIG. 11 depicts a local storage performance comparison of various types of SSDs. As shown in FIG. 11, LocalSSD may decrease the storage performance by 24.8%, compared to a regular SSD. For the workloads of sequential/random writes, LocalSSD may perform even worse due to the significant garbage collection overhead. LocalSSD+Compression may outperform LocalSSD by 1.13× on average, as the delta compression may reduce the storage space occupied by stale data. The RSSD may outperform LocalSSD by 1.31× on average, as it further free storage space. For sequential read/write and random read workloads, the RSSD may perform similarly to others, as there are no invalid pages produced. For PostMark workload, the RSSD may achieve 1.71× speedup, compared to LocalSSD. For OLTP workloads, the RSSD may offer 1.63× (8.5K TPS), 1.43× (38.0K TPS), 1.42× (135.7K TPS) more throughput than LocalSSD for TPCC, TPCB, and TATP, respectively. For these application workloads, the RSSD may perform even better than a regular SSD, because the RSSD gradually utilizes the idle I/O cycles to transfer stale data to the remote storage, which may free more storage space.

D. Performance Impact of the Network

Figure 12:
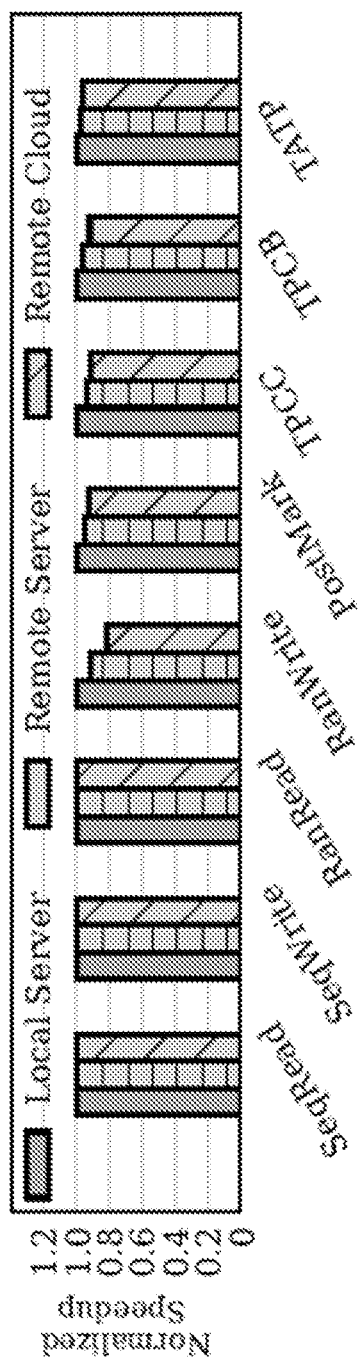
FIG. 12 depicts the impact of connected remote servers on storage operations, in accordance with example embodiments.

Furthermore, to evaluate the performance impact of the NVMe-oE network connected to the remote server, another two configurations were tested. The local server was replaced with (i) another similar server located in another university (Remote Server), and (ii) the Amazon S3 cloud storage service (Remote Cloud), respectively. FIG. 12 depicts the impact of connected remote servers on storage operations. As shown in FIG. 12, the performance of the RSSD may slightly drop by 3.2% and 6.7% when connected with Remote Server and Remote Cloud, respectively. As the transfer speed becomes slower, the local SSD may retain more stale data temporarily, which may affect the local storage performance. If the SSD is disconnected to the remote cloud/server, the RSSD may still compress and retain the stale data until the device becomes full.

E. Impact on SSD Lifetime

Figure 13:
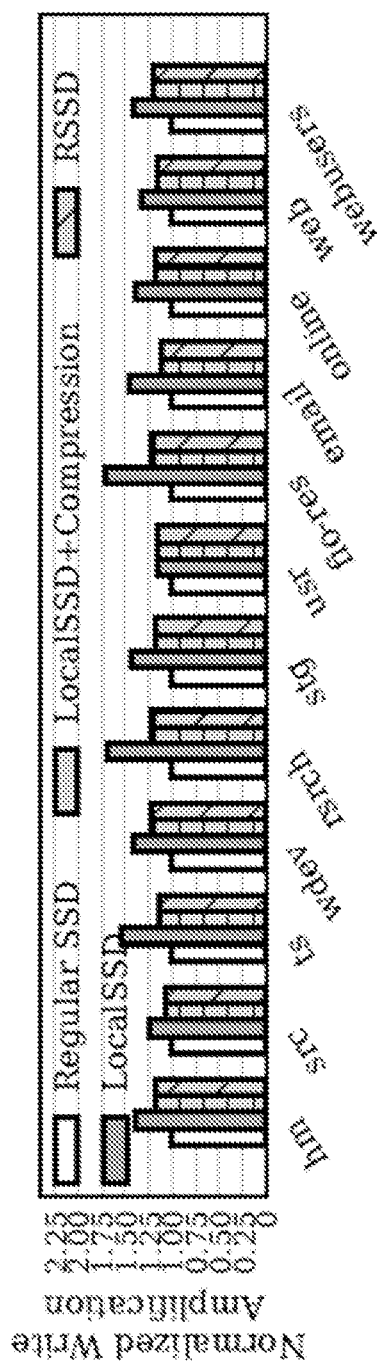
FIG. 13 depicts an SSD lifetime comparison among various types of SSDs, in accordance with example embodiments.

The ratio of flash write traffic to user-space write traffic may be used as the write amplification metric for the SSD lifetime. FIG. 13 depicts an SSD lifetime comparison among various types of SSDs. As shown in FIG. 13, LocalSSD and LocalSSD+Compression may increase the write amplification by 42.9% and 16.7% on average respectively, under 80% capacity utilization (higher write amplification means a shorter lifetime). This may be caused by the page migration of retained stale data during garbage collection. Compared to LocalSSD+Compression, the RSSD may introduce little new write traffic to the SSD when it transfers data to remote server. Thus, the RSSD may not increase the write amplification.

F. Recovery from Ransomware Attacks

Figure 14:
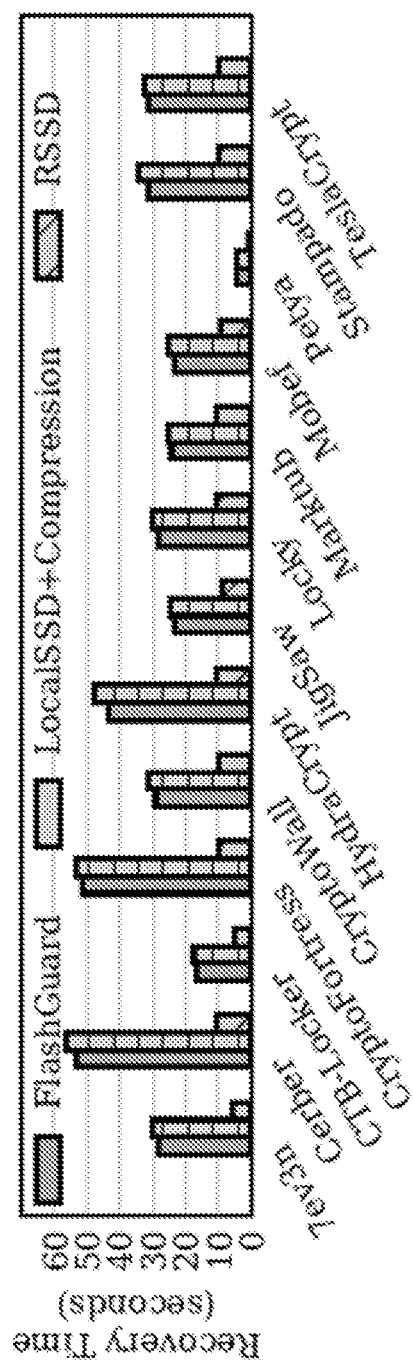
FIG. 14 depicts data recovery time after ransomware attacks among various SSDs, in accordance with example embodiments.

To evaluate the data recovery, the RSSD may be compared to the existing work FlashGuard, which retains only the invalid pages potentially encrypted by ransomware. Thirteen ransomware samples were used from VirusTotal and run in a virtual machine with the local SSD mounted. FIG. 14 depicts data recovery time after ransomware attacks among various SSDs. As shown in FIG. 14, LocalSSD+Compression may need 12.4% more time to recover the data encrypted by ransomware, due to the data decompression in the SSD. The RSSD may significantly reduce the recovery time (4.2× on average), when the packed stale data is available on the remote server, as it may take advantage of the powerful computing resource to speed up the data decryption and decompression, and parallelize the stale data lookups.

Note that our proposed new attacks may easily bypass state-of-the-art approaches, such as FlashGuard, SSDInsider, RansomBlocker, and others. They may invalidate most of these detection mechanisms developed based on learning existing ransomware behaviors. And existing data recovery approaches may not be able to defend against these new attacks, as most of them may only retain the victim data for a limited time. And none of them may be able to retain the victim data caused by the trim command.

G. Effectiveness of Post-Attack Analysis

Figure 15:
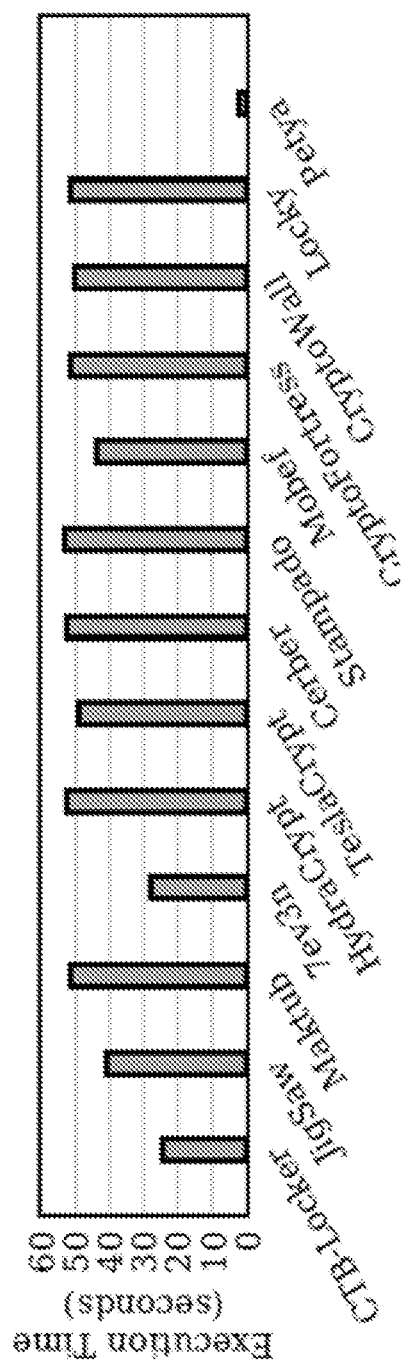
FIG. 15 depicts the performance of the post-attack analysis of each ransomware sample, in accordance with example embodiments.

As discussed above, the RSSD may enable post-attack analysis by logging all the storage operations. To evaluate the effectiveness of this function, post-attack analysis was conducted after running the thirteen encryption ransomware samples as used above. The post-attack analysis may have been used when the packed stale data is available on the remote server. During the post-attack analysis, the evidence chain may have been built by listing all the storage operations in the victim SSD in time order, it may include the timestamp of issuing the storage operation, the operation type (read/write/trim), the logical page address, and the physical page address. With this evidence chain, the attack procedure may be able to be replayed. The performance of the post-attack analysis of each ransomware sample is presented in FIG. 15. The RSSD may be able to finish the analysis in 2.6-52.5 seconds.

X. Cost-Effectiveness of RSSD

The RSSD may be a cost-effective and reliable solution. The RSSD may be compared to similar approaches that increase the local storage capacity, e.g., (1) an SSD capable of packing more flash chips or (2) a hybrid SSD and HDD system implemented locally.

To implement (1), additional flash modules were plugged into the OpenSSD board to increase its capacity to 2 TB (Expanded SSD in Table 2). The additional flash memory was assumed to be $0.2/GB, and remote cloud storage price was assumed to be $0.00081/GB per month. For the RSSD, the network costs were modelled off of cloud storage, including calculations of the data transfer cost, which is currently free in both Amazon S3 and Azure. The storage traces (see FIG. 16) was rerun until the SSD became full. The RSSD was compared to LocalSSD+Compression that retained compressed stale data in the local SSD until the local SSD becomes full. The RSSD may reduce the storage cost by 85.6× on average (see Table 2), while providing the flexibility of extending the storage capacity. A conservative calculation was done assuming $0.0228 per 10K writes and $0.00182 per 10K reads. In a situation where the data is retained for as long as the LocalSSD+Compression, the RSSD may still achieve 74.5× cost reduction on average. Note that the RSSD may introduce trivial overhead to the local storage performance as mentioned above.

To implement (2), the local storage capacity may be expanded by using a HDD (10 TB) in addition to the SSD (1 TB) and implemented locally. For this approach, the HDD price may be assumed to be $0.02/GB. The RSSD may reduce the storage cost by 8.6× on average (see SSD+HDD in FIG. 17). Additionally, it may be advantageous to implement the RSSD in a remote cloud, as delocalizing some of the storage may offer enhanced flexibility and data reliability to expand the storage capacity with lower cost. It may be worth noting that the RSSD may also support the connection with private storage servers via NVMe-oE, in which HDDs may be deployed in these servers to store retained stale data. As discussed above, each ransomware attack may request an average of thousands of dollars from victims. The storage cost that may be required by the RSSD may be much less than that of successful ransomware attacks.

XI. Improvements over Previous Solutions

Ransomware Defenses. Data backup and recovery methods may enable users to restore their data to their previously stored copies. They may include log-structured file systems, journaling file systems, and cloud-based storage systems. However, since ransomware attacks may be run with kernel privileges, these backup systems may be easily disabled or compromised. The hardware-isolated data backup mechanism designed and developed herein may be made to be transparently resistant to ransomware attacks. Conventional SSDs may include versioning operations and may retain the storage states. However, these SSDs may suffer from limited storage capacity. The proposed RSSD may implement a new approach to extend storage capacity in a secure and transparent manner.

Ransomware Detection. Ransomware attacks and their detection mechanisms have been investigated. For instance, machine learning may have been proposed and leveraged to perform ransomware classification. However, these methods may not be able to recover damage to the data that has been caused by these attacks. Thus, ransomware attackers may nonetheless lock up some of the victim data, forcing the victims to pay a ransom.

Secure Storage Architecture. Many flash-based storage solutions are focused on performance rather than security. For example, increasing storage capacity and performance may be high priority considerations, while security may be rarely considered. Although flash-based storage devices have been deployed on various computing platforms, none of these released products have claimed to defend against ransomware attacks. Note that the RSSD presented herein may be implemented in part using a conventional SSD.

Post-Attack Analysis. To further strengthen storage security, it may be important to conduct vulnerability analysis after identifying malware attacks. However, ransomware attackers may be able to destroy evidence of the attack and perform malicious modifications to the logs in an attempt to hide their behaviors. The RSSD may retain all the storage operations in the SSD, which may reconstruct the entire evidence chain, including anti-forensic operations. Most importantly, this evidence chain may be trusted, as the logging procedure may be conducted in a firmware-isolated manner, which may not be able to be manipulated by malware.

XII. Example Operations

Figure 18:
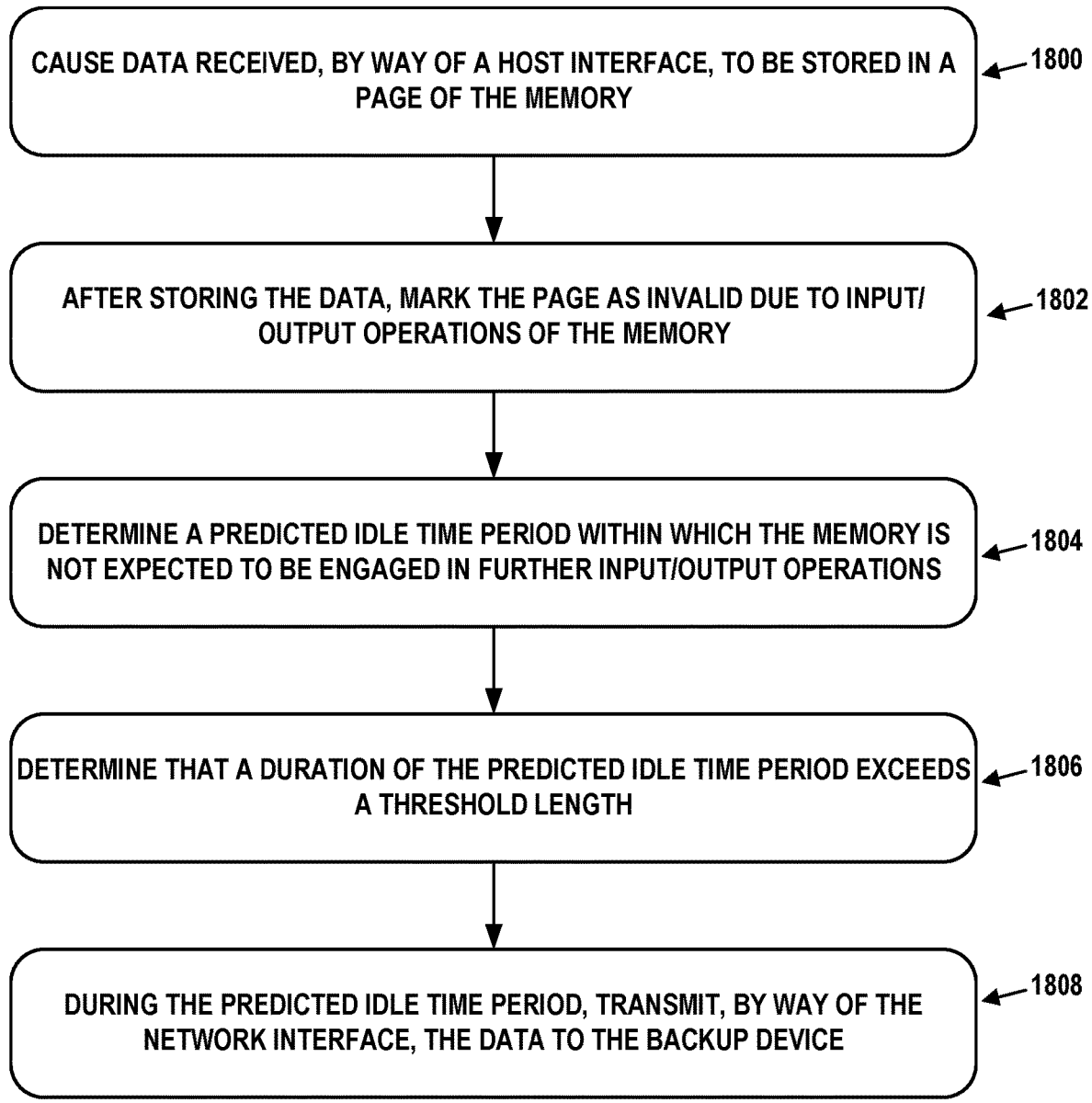
FIG. 18 is a flow chart, in accordance with example embodiments.

FIG. 18 is a flow chart illustrating an example embodiment. The process illustrated by FIG. 18 may be carried out by a storage device comprising one or more processors, memory, a host interface connectable to a host device, a network interface connectable to a backup device, and program instructions, stored in memory, that upon execution by the one or more processors cause the storage device to perform the illustrated operations. The embodiments of FIG. 18 may be simplified by the removal of any one or more of the features shown. Further, these embodiments may be combined with features, aspects, and/or implementations of any of the previous figures or concepts otherwise described herein.

Block 1800 may involve causing data received, by way of the host interface, to be stored in a page of the memory.

Block 1802 may involve, after storing the data, marking the page as invalid due to input/output operations of the memory.

Block 1804 may involve determining a predicted idle time period within which the memory is not expected to be engaged in further input/output operations.

Block 1806 may involve determining that a duration of the predicted idle time period exceeds a threshold length.

Block 1808 may involve, during the predicted idle time period, transmitting, by way of the network interface, the data to the backup device.

In some embodiments, the network interface may be configured with a network address different from that of the host device.

In some embodiments, causing the data received from the host device to be stored in the page of the memory may comprise storing a timestamp of when the data was received in out-of-band metadata of the page and transmitting the data to the backup device may comprise transmitting the out-of-band metadata to the backup device.

In some embodiments, the operations may further comprise receiving a request to restore a version of the data received at the timestamp and traversing a plurality of versions of the data based on timestamps stored in the out-of-band metadata to retrieve the version of the data received at the timestamp.

In some embodiments, determining the predicted idle time period may comprise obtaining a predicted previous idle time period during which the memory was not expected to be engaged in previous input/output operations, based on the previous input/output operations, determining a real time previous idle time period during which the memory was not engaged in the previous input/output operations, where the real previous idle time corresponds to the predicted previous idle time, and determining the predicted idle time period based on the predicted previous idle time period, the real previous idle time period, and a smoothing parameter.

In some embodiments, the memory may include memory blocks and compressed data blocks. The page may reside within a particular data block of the data blocks. The operations may further comprise initiating a garbage collection procedure on the memory. The operations may also comprise during the garbage collection procedure on the particular data block, determining that the page has been marked as invalid. The operations may further comprise based on the page being marked as invalid, compressing the data and storing the data as compressed in a particular compressed data block of the compressed data blocks, where transmitting the data to the backup device comprises transmitting the data as compressed to the backup device. The operations may additionally comprise erasing the particular data block.

In some embodiments, transmitting the data as compressed to the backup device may comprise transmitting content of the compressed data blocks in time order starting with an oldest compressed data block.

In some embodiments, the page may be associated with a physical page address. The storage device may maintain a plurality of Bloom filters in time order of creation. Marking the page as invalid may comprise inserting the physical page address in a current Bloom filter that is a most-recently created one of the plurality of Bloom filters.

In some embodiments, marking the page as invalid may further comprise determining that a count of physical page addresses in the current Bloom filter exceeds a threshold count, creating a new Bloom filter for maintaining of physical page addresses associated with further pages of the memory to which further data will be written, and setting the new Bloom filter to be the current Bloom filter.

In some embodiments, the operations may further comprise during the garbage collection procedure, determining that the physical page address is in one of the plurality of Bloom filters, where compressing the data and storing the data as compressed in a particular compressed data block of the compressed data blocks is also based on the physical page address being in one of the plurality of Bloom filters.

In some embodiments, the memory may also include tracking blocks. The operations may further comprise: receiving a command to be performed on the memory, where the command is a read command or a trim command; and storing a representation of the command in the tracking blocks, wherein transmitting the data to the backup device also comprises transmitting content of the tracking blocks to the backup device.

In some embodiments, transmitting the data to the backup device may comprise transmitting content of the tracking blocks in time order starting with an oldest tracking block.

In some embodiments, a method may be performed within a storage device. The method may comprise causing data received, by way of a host interface and from a host device, to be stored in a page of a memory, after storing the data, marking the page as invalid due to input/output operations of the memory, determining a predicted idle time period within which the memory is not expected to be engaged in further input/output operations, determining that a duration of the predicted idle time period exceeds a threshold length, and during the predicted idle time period, transmitting, by way of a network interface, the data to a backup device. The method may be expanded to incorporate any of the features, aspects, and/or implementations of any of the previous figures or concepts otherwise described herein.

XIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method performed within a storage device containing a host interface and a network interface, the method comprising:
    causing data received, by way of the host interface and from a host device, to be stored in a page of a memory;
    after storing the data, marking the page as invalid due to input/output operations of the memory;
    determining a predicted idle time period within which the memory is not expected to be engaged in further input/output operations;
    determining that a duration of the predicted idle time period exceeds a threshold length; and
    during the predicted idle time period, transmitting, by way of the network interface, the data to a backup device.

2. The method of claim 1, wherein the network interface is configured with a network address different from that of the host device.

3. The method of claim 1, wherein causing the data received from the host device to be stored in the page of the memory comprises storing a timestamp of when the data was received in out-of-band metadata of the page, and wherein transmitting the data to the backup device comprises transmitting the out-of-band metadata to the backup device.

4. The method of claim 3, further comprising:
receiving a request to restore a version of the data received at the timestamp; and
traversing a plurality of versions of the data based on timestamps stored in the out-of-band metadata to retrieve the version of the data received at the timestamp.

5. The method of claim 1, wherein determining the predicted idle time period comprises:
obtaining a predicted previous idle time period during which the memory was not expected to be engaged in previous input/output operations;
based on the previous input/output operations, determining a real previous idle time period during which the memory was not engaged in the previous input/output operations, wherein the real previous idle time period corresponds to the predicted previous idle time period; and
determining the predicted idle time period based on the predicted previous idle time period, the real previous idle time period, and a smoothing parameter.

6. The method of claim 1, wherein the memory includes data blocks and compressed data blocks, wherein the page resides within a particular data block of the data blocks, and wherein the method further comprises:
initiating a garbage collection procedure on the memory;
during the garbage collection procedure on the particular data block, determining that the page has been marked as invalid;
based on the page being marked as invalid, compressing the data and storing the data as compressed in a particular compressed data block of the compressed data blocks, wherein transmitting the data to the backup device comprises transmitting the data as compressed to the backup device; and
erasing the particular data block.

7. The method of claim 6, wherein transmitting the data as compressed to the backup device comprises transmitting content of the compressed data blocks in time order starting with an oldest compressed data block.

8. An article of manufacture including a non-transitory computer-readable medium, having stored thereon program instructions that, upon execution by a computing system, cause a storage device containing a host interface and a network interface to perform operations comprising:
causing data received, by way of the host interface, to be stored in a page of a memory;
after storing the data, marking the page as invalid due to input/output operations of the memory;
determining a predicted idle time period within which the memory is not expected to be engaged in further input/output operations;
determining that a duration of the predicted idle time period exceeds a threshold length; and
during the predicted idle time period, transmitting, by way of the network interface, the data to a backup device.

9. A storage device comprising:
one or more processors;
memory;
a host interface connectable to a host device;
a network interface connectable to a backup device; and
program instructions, stored in the memory, that upon execution by the one or more processors cause the storage device to perform operations comprising:
causing data received, by way of the host interface, to be stored in a page of the memory;
after storing the data, marking the page as invalid due to input/output operations of the memory;
determining a predicted idle time period within which the memory is not expected to be engaged in further input/output operations;
determining that a duration of the predicted idle time period exceeds a threshold length; and
during the predicted idle time period, transmitting, by way of the network interface, the data to the backup device.

10. The storage device of claim 9, wherein the network interface is configured with a network address different from that of the host device.

11. The storage device of claim 9, wherein causing the data received from the host device to be stored in the page of the memory comprises storing a timestamp of when the data was received in out-of-band metadata of the page, and wherein transmitting the data to the backup device comprises transmitting the out-of-band metadata to the backup device.

12. The storage device of claim 11, wherein the operations further comprise:
receiving a request to restore a version of the data received at the timestamp; and
traversing a plurality of versions of the data based on timestamps stored in the out-of-band metadata to retrieve the version of the data received at the timestamp.

13. The storage device of claim 9, wherein determining the predicted idle time period comprises:
obtaining a predicted previous idle time period during which the memory was not expected to be engaged in previous input/output operations;
based on the previous input/output operations, determining a real previous idle time period during which the memory was not engaged in the previous input/output operations, wherein the real previous idle time period corresponds to the predicted previous idle time period; and
determining the predicted idle time period based on the predicted previous idle time period, the real previous idle time period, and a smoothing parameter.

14. The storage device of claim 9, wherein the memory includes data blocks and compressed data blocks, wherein the page resides within a particular data block of the data blocks, and wherein the operations further comprise:
initiating a garbage collection procedure on the memory;
during the garbage collection procedure on the particular data block, determining that the page has been marked as invalid;
based on the page being marked as invalid, compressing the data and storing the data as compressed in a particular compressed data block of the compressed data blocks, wherein transmitting the data to the backup device comprises transmitting the data as compressed to the backup device; and
erasing the particular data block.

15. The storage device of claim 14, wherein transmitting the data as compressed to the backup device comprises transmitting content of the compressed data blocks in time order starting with an oldest compressed data block.

16. The storage device of claim 14, wherein the page is associated with a physical page address, wherein the storage device maintains a plurality of Bloom filters in time order of creation, and wherein marking the page as invalid comprises:

inserting the physical page address in a current Bloom filter that is a most-recently created one of the plurality of Bloom filters.

17. The storage device of claim 16, wherein marking the page as invalid further comprises:
   determining that a count of physical page addresses in the current Bloom filter exceeds a threshold count;
   creating a new Bloom filter for maintaining of physical page addresses associated with further pages of the memory to which further data will be written; and
   setting the new Bloom filter to be the current Bloom filter.

18. The storage device of claim 16, wherein the operations further comprise:
   during the garbage collection procedure, determining that the physical page address is in one of the plurality of Bloom filters, wherein compressing the data and storing the data as compressed in a particular compressed data block of the compressed data blocks is also based on the physical page address being in one of the plurality of Bloom filters.

19. The storage device of claim 9, wherein the memory also includes tracking blocks, and wherein the operations further comprise:
   receiving a command to be performed on the memory, where the command is a read command or a trim command; and
   storing a representation of the command in the tracking blocks, wherein transmitting the data to the backup device also comprises transmitting content of the tracking blocks to the backup device.

20. The storage device of claim 19, wherein transmitting the data to the backup device comprises transmitting content of the tracking blocks in time order starting with an oldest tracking block.

* * * * *